US012520228B2

(12) United States Patent
Batta et al.

(10) Patent No.: US 12,520,228 B2
(45) Date of Patent: Jan. 6, 2026

(54) INITIATION OF TARGET WAKE TIME (TWT) SESSION ESTABLISHMENT DURING FAST BASIC SERVICE SET (BSS) TRANSITION

(71) Applicant: QUALCOMM Incorporated, San Diego, CA (US)

(72) Inventors: Kamal Teja Batta, Hyderabad (IN); Santhi Swaroop Golti, Hyderabad (IN); Arun Kumar Khandavalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 18/148,207

(22) Filed: Dec. 29, 2022

(65) Prior Publication Data

US 2024/0224160 A1    Jul. 4, 2024

(51) Int. Cl.
*H04W 48/08* (2009.01)
*H04W 52/02* (2009.01)

(52) U.S. Cl.
CPC ....... *H04W 48/08* (2013.01); *H04W 52/0216* (2013.01)

(58) Field of Classification Search
None
See application file for complete search history.

(56) References Cited

U.S. PATENT DOCUMENTS

2006/0079241 A1* 4/2006 Faccin ............ H04W 36/00692
                                              455/450
2017/0311258 A1* 10/2017 Asterjadhi .......... H04W 28/022

FOREIGN PATENT DOCUMENTS

WO    2022124979 A1    6/2022

OTHER PUBLICATIONS

IEEE P802.11: "9. Frame Formats 9.1 General Requirements", REVMD_CL_09.FM, IEEE-SA, Piscataway, NJ, USA, vol. 802.11md Drafts, 802.11 Drafts; 802.11m Drafts, No. D0.3, Sep. 7, 2017, pp. 1-221, XP068137772, paragraph [6.5.7.3.2] table 6.4.
International Search Report and Written Opinion—PCT/US2023/078859—ISA/EPO—Mar. 1, 2024.

* cited by examiner

*Primary Examiner* — Walter J Divito
(74) *Attorney, Agent, or Firm* — AVEK IP, LLC (QUALCOMM)

(57) ABSTRACT

This disclosure provides wireless communication methods, components, devices and systems for target wake time (TWT) session establishment. In some examples, a wireless communication device can include, in a frame that it transmits in conjunction with a fast basic service set (BSS) transition, a resource information container (RIC) containing a resource request that indicates a set of proposed TWT parameters for a TWT session between the wireless communication device and a target access point (AP) of the fast BSS transition. In some examples, the RIC can additionally include resource request(s) indicating traffic specification (TSPEC) traffic stream setup request(s), block acknowledgment setup request(s) or a combination of both. In some examples, the wireless communication device can include multiple TWT requests in the RIC, optionally in combination with one or more TSPEC resource requests, one or more block acknowledgment resource requests or a combination of both.

20 Claims, 17 Drawing Sheets

INITIATION OF TARGET WAKE TIME (TWT) SESSION ESTABLISHMENT DURING FAST BASIC SERVICE SET (BSS) TRANSITION

TECHNICAL FIELD

This disclosure relates generally to wireless communication, and more specifically, to the establishment of target wake time (TWT) sessions.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some WLANs can include multiple BSSs, and multiple respective APs that manage those BSSs. As a STA moves around in such a WLAN, it may be desirable for the STA to transition among different BSSs of the WLAN (such as in order to optimize signal quality as the STA moves closer to some APs and further from other APs). To mitigate the burden involved in transitioning among BSSs, such a STA can implement a fast BSS transition procedure. According to the fast BSS transition procedure, the BSS transition can be streamlined by conducting certain security and quality-of-service (QoS)-related communication exchanges in combination with authentication and reassociation message exchanges.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device can include a processing system and one or more interfaces. The processing system can be capable of selecting a set of proposed target wake time (TWT) parameters for a TWT request to be conveyed to a target access point (AP). The one or more interfaces can be capable of outputting, associated with a fast basic service set (BSS) transition from a current AP to the target AP, a frame including a resource information container (RIC) containing a resource request indicating the TWT request, the resource request including a RIC descriptor element indicating the set of proposed TWT parameters.

Another innovative aspect of the subject matter described in this disclosure can be implemented in a method for wireless communication by a wireless communication device. The method can include selecting a set of proposed target wake time (TWT) parameters for a TWT request to be conveyed to a target access point (AP), and transmitting, associated with a fast basic service set (BSS) transition from a current AP to the target AP, a frame including a resource information container (RIC) containing a resource request indicating the TWT request, the resource request including a RIC descriptor element indicating the set of proposed TWT parameters.

In some implementations of the wireless communication device and method, the resource request can include both the RIC descriptor element and a second RIC descriptor element, where the RIC descriptor element indicates one set of proposed TWT parameters for the TWT request and the second RIC descriptor element indicates another set of proposed TWT parameters for that TWT request.

In some implementations of the wireless communication device and method, the RIC can include both the resource request and a second resource request, where the resource request indicates proposed TWT parameters for one TWT request and the second resource request indicates proposed TWT parameters for another TWT request.

In some implementations of the wireless communication device and method, the RIC can include both the resource request and a second resource request, where the resource request indicates proposed TWT parameters for the TWT request and the second resource request includes a traffic specification (TSPEC) element that indicates a set of traffic stream parameters for a traffic stream setup request.

In some implementations of the wireless communication device and method, the RIC can include both the resource request and a second resource request, where the resource request indicates proposed TWT parameters for the TWT request and the second resource request includes a RIC descriptor element that indicates a set of block acknowledgment parameters for a block acknowledgment setup request.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
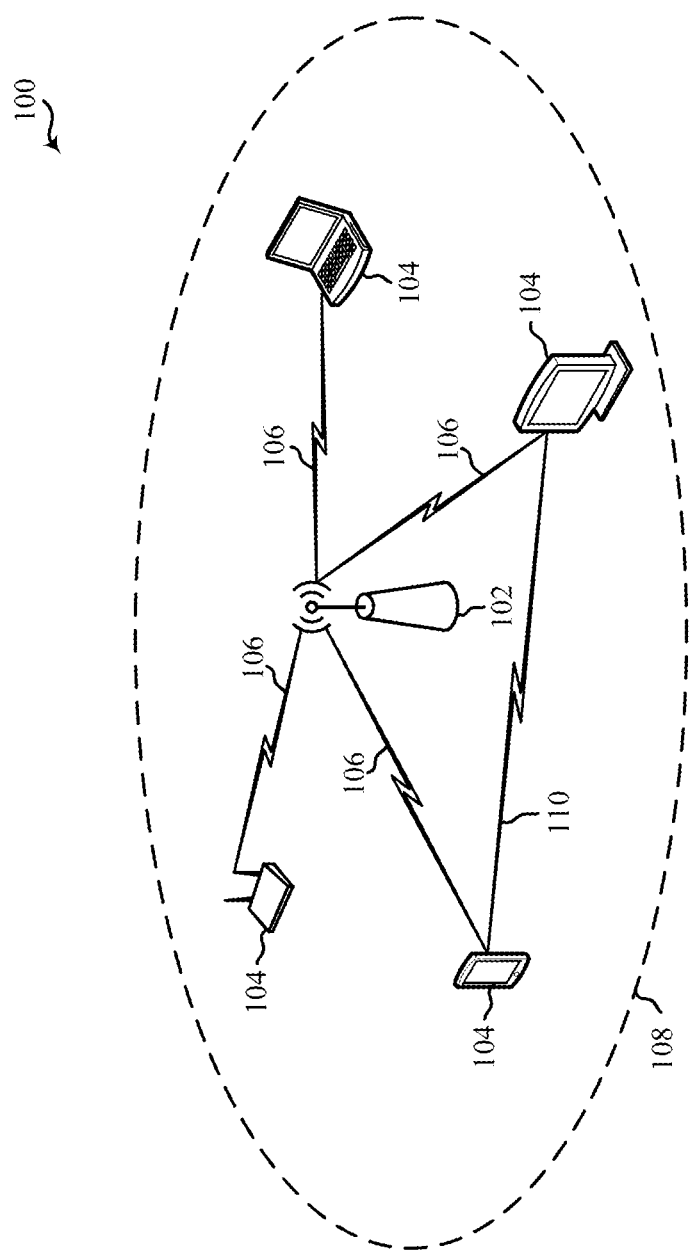
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN) or an internet of things (IOT) network.

Various aspects relate generally to wireless communication and more particularly to the establishment of target wake time (TWT) sessions. Some aspects more specifically relate to parameter communication techniques and medium access control (MAC) frame designs that support conveying TWT requests in conjunction with fast basic service set (BSS) transitions. In some examples, a wireless communication device, such as a station (STA), can include a TWT request in a frame that it transmits in conjunction with a fast BSS transition from a current access point (AP) to a target AP. In some examples, the frame can be transmitted to the target AP, while in other examples, the frame can be transmitted to the current AP, which can convey the TWT request to the target AP. The TWT request can indicate a set of TWT parameters that the wireless communication device proposes for a TWT session between the wireless communication device and the target AP. The wireless communication device can include the TWT request in a resource information container (RIC) contained in the frame. In some examples, the wireless communication device can use the frame to convey resource request(s) of other type(s) in addition to the TWT request. For instance, in some examples, in addition to the TWT request, the RIC can include resource request(s) indicating traffic specification (TSPEC) traffic stream setup request(s), block acknowledgment (BA) setup request(s) or a combination of both. In some examples, the wireless communication device can use the frame to convey multiple TWT requests by including multiple TWT requests in the RIC, optionally in combination with resource request(s) of other type(s) such as TSPEC request(s), BA request(s), or both.

Particular aspects of the subject matter described in this disclosure can be implemented to realize one or more of the following potential advantages. In some examples, by initiating the process of TWT session establishment during a fast BSS transition rather than waiting for the fast BSS transition to complete, a wireless communication device may complete TWT session establishment earlier, which may enable it to more quickly transition to a power-saving state. Additionally, the need for a frame exchange to establish the TWT session following the fast BSS transition may be obviated. Also, the ability to send multiple TWT requests in the same frame may provide the wireless communication device with a way to increase its likelihood of identifying TWT parameters that are mutually-agreeable to itself and the AP. Furthermore, the flexibility to include TWT request(s) in a RIC that can include resource request(s) of other type(s), such as TSPEC request(s), BA request(s) or both, may allow the wireless communication device to initiate TWT session establishment during a fast BSS transition without imposing additional overhead on the network.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.1 lbf and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs) and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS) or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
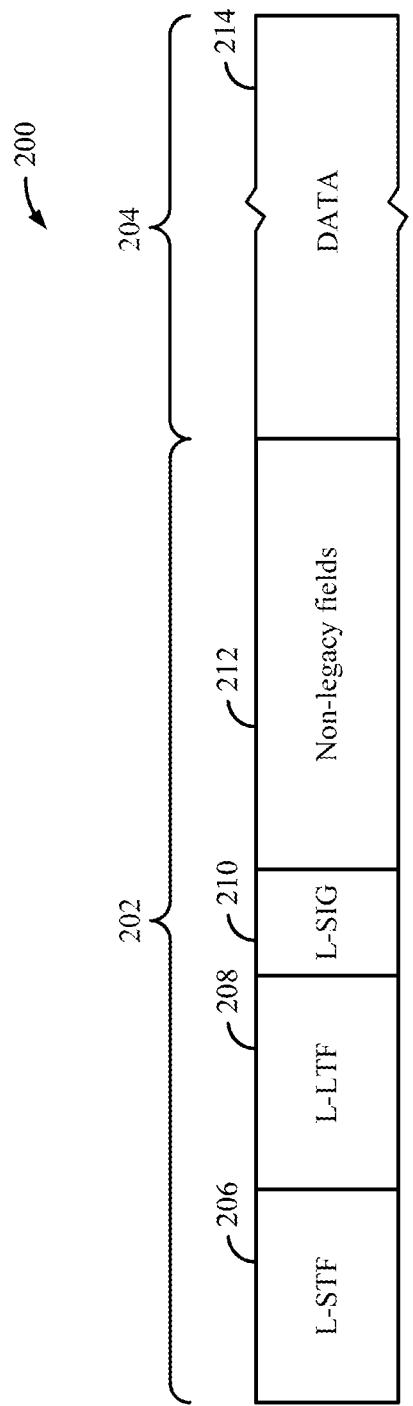
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
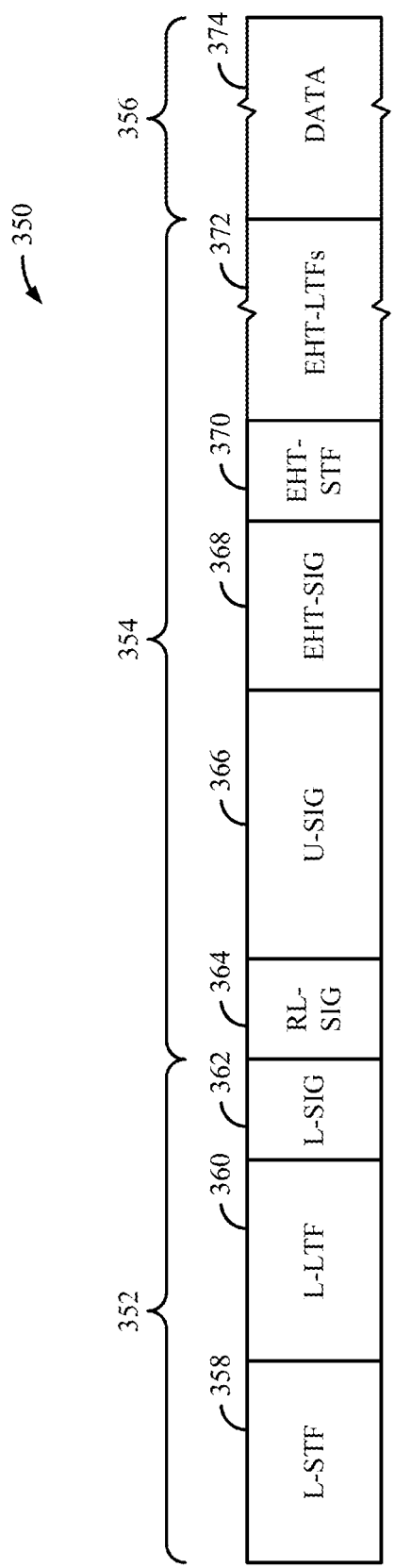
FIG. 3 shows an example physical layer (PHY) protocol data unit (PPDU) usable for communications between a wireless access point (AP) and one or more wireless stations (STAs).

FIG. 3 shows another example PPDU 350 usable for wireless communication between a wireless AP and one or more wireless STAs. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360 and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360 and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP to identify and inform one or multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

In some wireless communications environments, Extremely High Throughput (EHT) systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at APs and STAs, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled to a different power amplifier). In some other examples, signals for transmission may be generated by four or more different transmit chains of the device, each having a bandwidth of 80 MHz.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHz. In some other examples, the 240 MHz/160+80 MHz bandwidth modes also may be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some examples, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure or signaling implemented for legacy systems.

Figure 4:
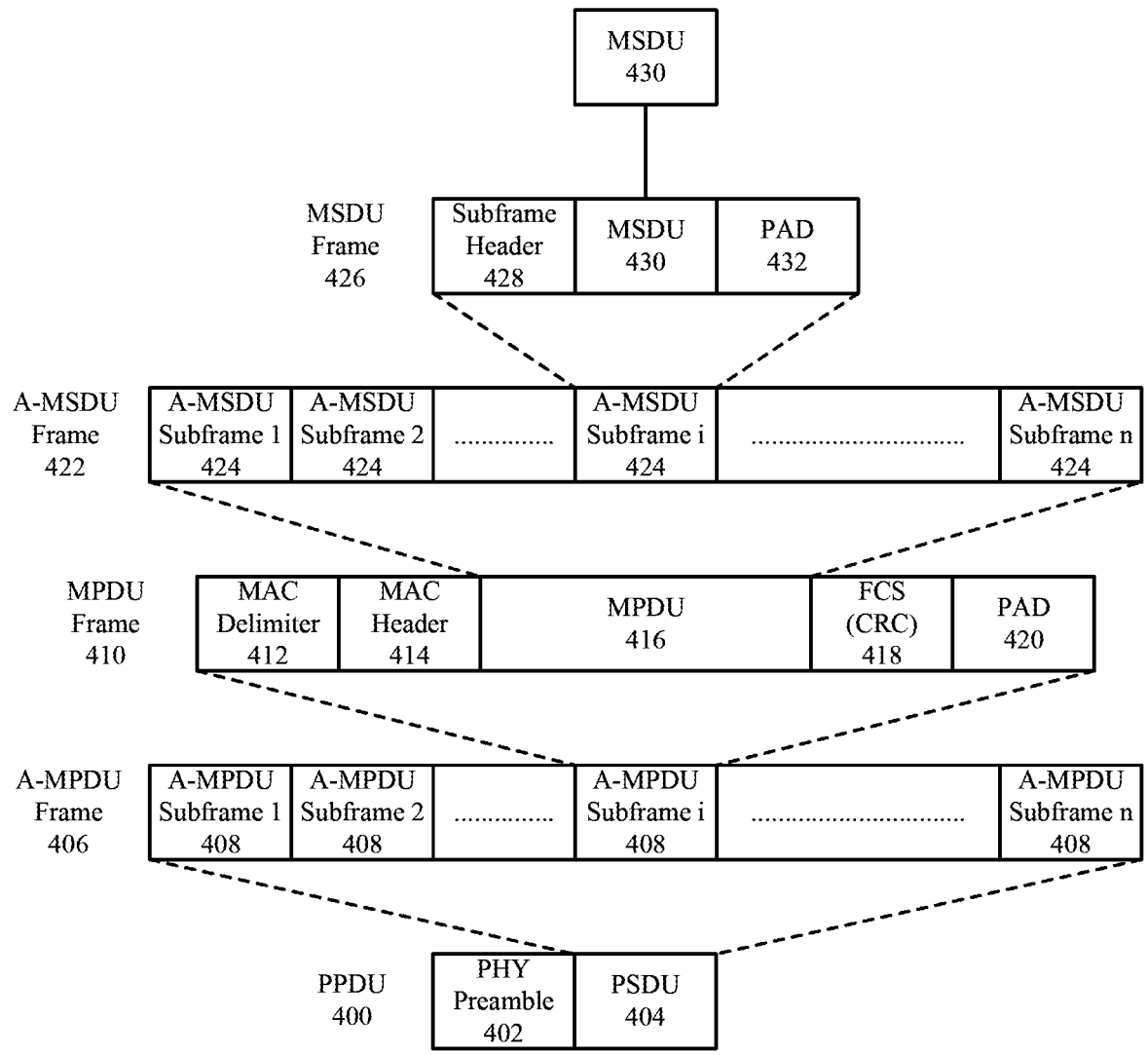
FIG. 4 shows a hierarchical format of an example PPDU usable for communications between a wireless AP and one or more wireless STAs.

FIG. 4 shows a hierarchical format of an example PPDU usable for communications between a wireless AP 102 and one or more wireless STAs 104. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS) and the arbitration IFS (AIFS). The values for the slot time and IFS may be provided by a suitable standard specification, such as one or more of the IEEE 802.11 family of wireless communication protocol standards.

In some examples, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK) and best effort (AC_BE). This enables particular types of traffic to be prioritized in the network.

Figure 5:
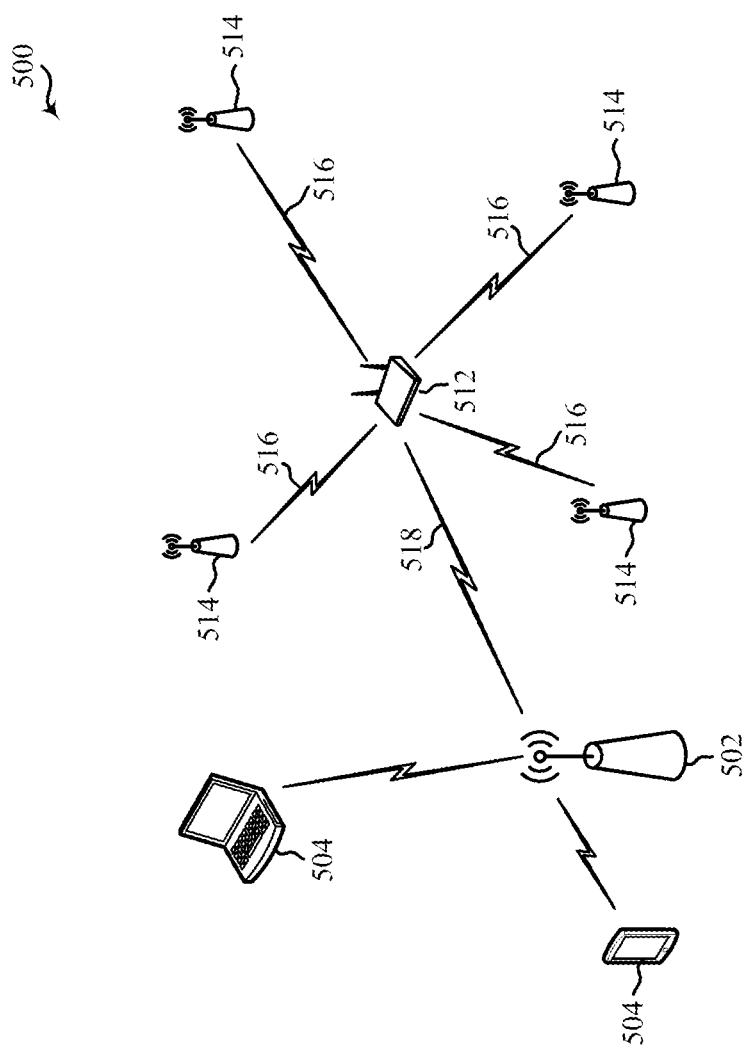
FIG. 5 shows a pictorial diagram of another example wireless communication network.

FIG. 5 shows a pictorial diagram of another example wireless communication network 500. According to some aspects, the wireless communication network 500 can be an example of a mesh network, an IoT network or a sensor network in accordance with one or more of the IEEE 802.11 family of wireless communication protocol standards (including the 802.11ah amendment). The wireless network 500 may include multiple wireless communication devices 514. The wireless communication devices 514 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 514 sense, measure, collect or otherwise obtain and process data and then transmit such raw or processed data to an intermediate device 512 for subsequent processing or distribution. Additionally or alternatively, the intermediate device 512 may transmit control information, digital content (for example, audio or video data), configuration information or other instructions to the wireless communication devices 514. The intermediate device 512 and the wireless communication devices 514 can communicate with one another via wireless communication links 516. In some examples, the wireless communication links 516 include Bluetooth links or other PAN or short-range communication links.

In some examples, the intermediate device 512 also may be configured for wireless communication with other networks such as with a Wi-Fi WLAN or a wireless (for example, cellular) wide area network (WWAN), which may, in turn, provide access to external networks including the Internet. For example, the intermediate device 512 may associate and communicate, over a Wi-Fi link 518, with an AP 502 of a WLAN network, which also may serve various STAs 504. In some examples, the intermediate device 512 is an example of a network gateway, for example, an IoT gateway. In such a manner, the intermediate device 512 may serve as an edge network bridge providing a Wi-Fi core backhaul for the IoT network including the wireless communication devices 514. In some examples, the intermediate device 512 can analyze, preprocess and aggregate data received from the wireless communication devices 514 locally at the edge before transmitting it to other devices or external networks via the Wi-Fi link 518. The intermediate device 512 also can provide additional security for the IoT network and the data it transports.

Figure 6:
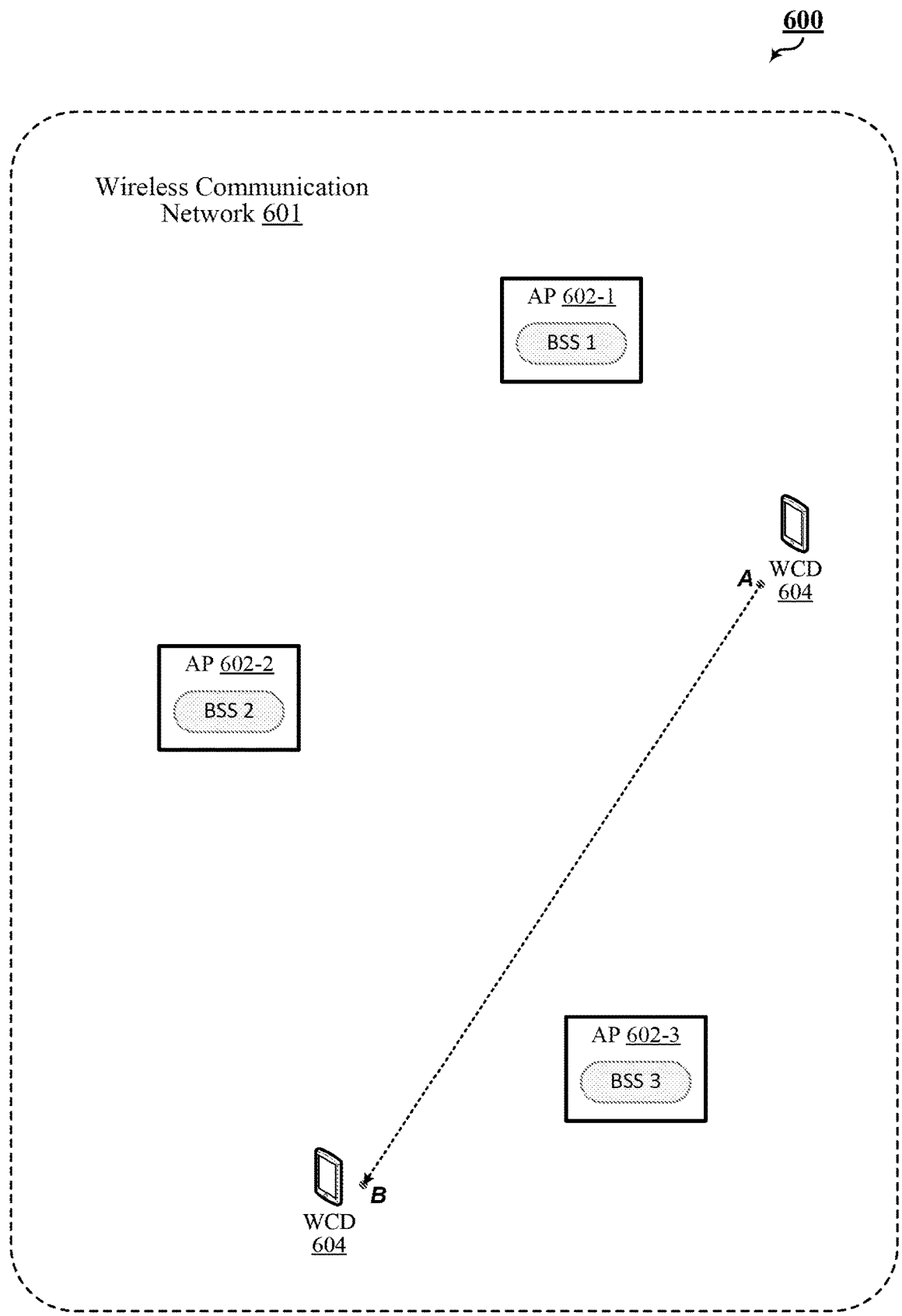
FIG. 6 shows a block diagram illustrating an example operating environment.

FIG. 6 shows a block diagram illustrating an example operating environment 600. In the operating environment 600, a wireless communication device 604 operates in a wireless communication network 601. In some examples, the wireless communication device 604 can be a wireless station (STA) and the wireless communication network 601 can be a WLAN. In some examples, the wireless communication device 604 can correspond to a STA 104 of FIG. 1. In some examples, the wireless communication device 604 can correspond to a STA 504 of FIG. 5. The wireless communication network 601 includes wireless access points (APs) 602-1, 602-2 and 602-3, which manage respective basic services sets (BSSs) 1, 2 and 3. In some examples, any particular one of wireless APs 602-1, 602-2 and 602-3 can correspond to the wireless AP 102 of FIG. 1. In some examples, any particular one of wireless APs 602-1, 602-2 and 602-3 can correspond to the wireless AP 502 of FIG. 5.

The most suitable BSS for the wireless communication device 604 (among the BSSs of wireless communication network 601) may depend on the wireless communication device 604's position within the wireless communication network 601. For example, at a point A in FIG. 6, the optimal channel quality available to the wireless communication device 604 may be via the BSS 1 managed by the AP 602-1, which is the closest AP to the point A. At a point B, on the other hand, the optimal channel quality available to the wireless communication device 604 may be via the BSS 3 managed by the AP 602-3, which is the closest AP to the point B.

If the wireless communication device 604 moves around within the wireless communication network 601, then as it moves, some BSSs may become less suitable while others may become more suitable. For instance, continuing the previous example, the BSS 1 may become less suitable for the wireless communication device 604 when it moves from the point A to the point B in FIG. 6, while the BSS 3 may become more suitable.

When its current BSS is less suitable than another BSS in the wireless communication network 601, it may be desirable for the wireless communication device 604 to transition from its current BSS to that other, more suitable BSS. To maintain connectivity while quickly and securely transitioning between BSSs, the wireless communication device 604 can initiate a fast BSS transition procedure. According to the fast BSS transition procedure, the wireless communication device 604 can act as a fast BSS transition originator (FTO) and can transition from a current BSS managed by a current AP to a target BSS managed by a target AP.

In some examples, the wireless communication device 604 can engage in an over-the-air fast BSS transition procedure to transition from its current BSS to the target BSS. An over-the-air fast BSS transition procedure can involve a communications exchange according to which the wireless communication device 604 directly exchanges messages with the target AP. In other examples, the wireless communication device 604 can engage in an over-the-distribution system (DS) fast BSS transition procedure to transition from its current BSS to the target BSS. An over-the-DS fast BSS transition procedure can involve a communications exchange according to which the wireless communication device 604 indirectly exchanges some messages with the target AP via its current AP, and directly exchanges other messages with the target AP.

Figure 7A:
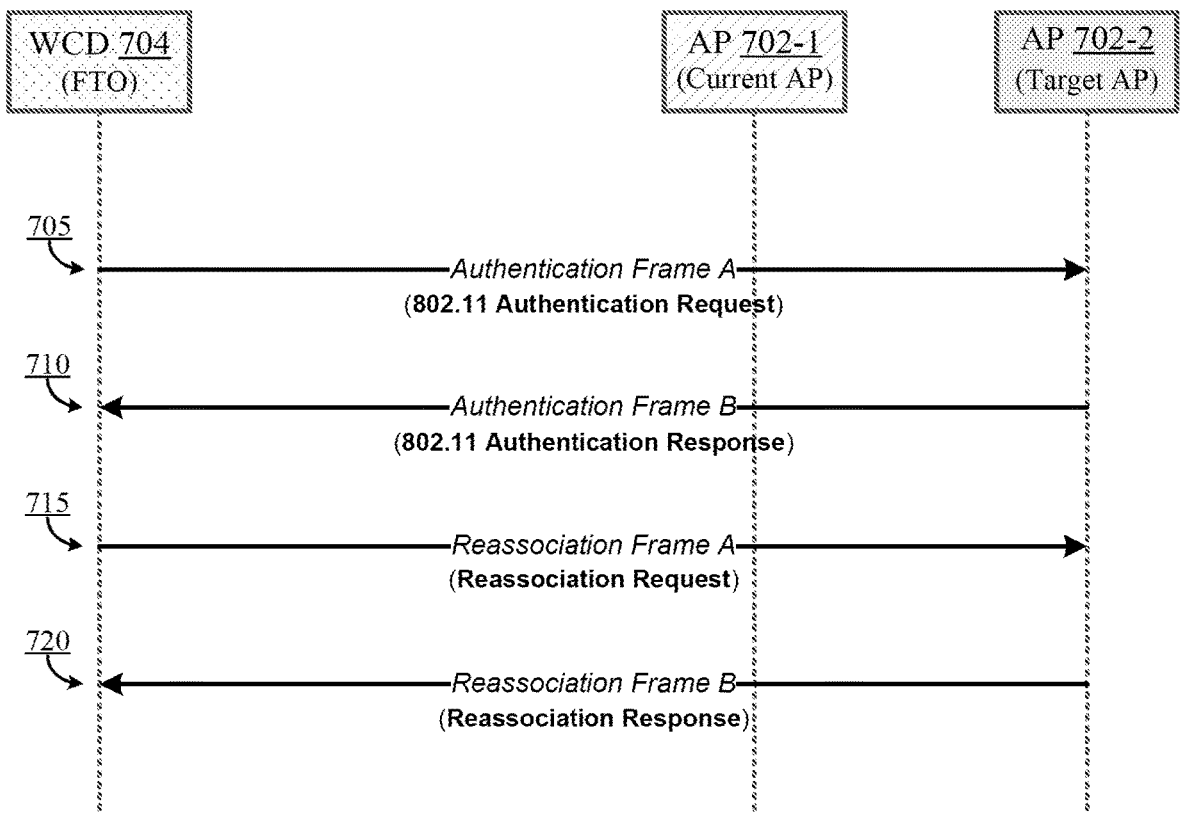
FIG. 7A shows an example of a communications exchange for an over-the-air fast BSS transition procedure.

FIG. 7A shows an example of a communications exchange 700 for an over-the-air fast BSS transition procedure according to which a wireless communication device 704, in the role of fast BSS transition originator (FTO), may transition from a current AP 702-1 to a target AP 702-2. The communications exchange 700 involves an exchange of authentication frames between the wireless communication device 704 and the target AP 702-2 at 705 and 710, and an exchange of reassociation frames between the wireless communication device 704 and the target AP 702-2 at 715 and 720. In some examples, the wireless communication device 704 can correspond to the wireless communication device 604 of FIG. 6. In some examples, the current AP 702-1 and the target AP 702-2 can correspond to respective APs in the wireless communication network 601 of FIG. 6, such as the APs 602-1 and 602-3, for instance.

At 705, the wireless communication device 704 transmits a first authentication frame (authentication frame A) to the target AP 702-2. At 710, the wireless communication device 704 receives a second authentication frame (authentication frame B) from the target AP 702-2. As shown in FIG. 7A, the authentication frame A can be an 802.11 Authentication Request frame, and the authentication frame B can be an 802.11 Authentication Response frame.

At 715, the wireless communication device 704 transmits a first reassociation frame (reassociation frame A) to the target AP 702-2. At 720, the wireless communication device 704 receives a second reassociation frame (reassociation frame B) from the target AP 702-2. As shown in FIG. 7A, the reassociation frame A can be a Reassociation Request frame, and the reassociation frame B can be a Reassociation Response frame.

Figure 7B:
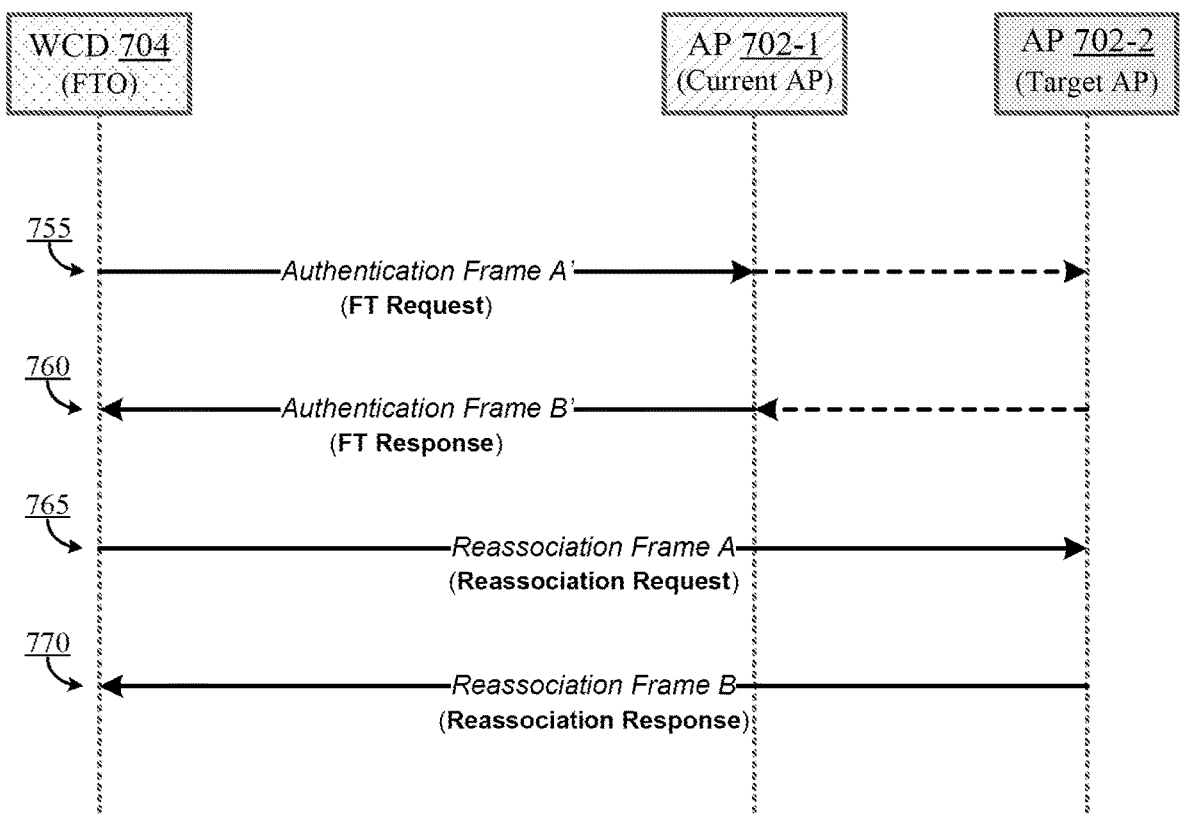
FIG. 7B shows an example of a communications exchange for an over-the-distribution system (DS) BSS transition procedure.

FIG. 7B shows an example of a communications exchange 750 for an over-the-distribution system (DS) BSS transition procedure according to which the wireless communication device 704 may transition from the current AP 702-1 to the target AP 702-2. The communications exchange 750 involves an exchange of authentication frames between the wireless communication device 704 and the current AP 702-1 at 755 and 760, and an exchange of reassociation frames between the wireless communication device 704 and the target AP 702-2 at 765 and 770.

At 755, the wireless communication device 704 transmits a first authentication frame (authentication frame A') to the current AP 702-1. At 760, the wireless communication device 704 receives a second authentication frame (authentication frame B') from the current AP 702-1. As shown in FIG. 7B, the authentication frame A' can be an FT Request frame, and the authentication frame B' can be an FT Response frame.

At 765, as at 715 in the communications exchange 700 of FIG. 7A, the wireless communication device 704 transmits the reassociation frame A to the target AP 702-2. At 770, as at 720 in the communications exchange 700 of FIG. 7A, the wireless communication device 704 receives the reassociation frame B from the target AP 702-2. As shown in FIG. 7B, the reassociation frame A can be a Reassociation Request frame, and the reassociation frame B can be a Reassociation Response frame.

In the operating environment 600 of FIG. 6, according to aspects of the subject matter described herein, the wireless communication device 604 can include a TWT request in a frame that it transmits in conjunction with an over-the-air or over-the-DS fast BSS transition in the wireless communication network 601. The TWT request can indicate a set of proposed TWT parameters for a TWT session between the wireless communication device 604 and the target AP of the fast BSS transition. In some examples, the wireless communication device 604 can include the TWT request in a resource information container (RIC) contained in the frame. Optionally, the wireless communication device 604 can include one or more resource requests of one or more other types in the RIC, along with the TWT request. For instance, in some examples, in addition to the TWT request, the RIC can include resource request(s) indicating traffic specification (TSPEC) traffic stream setup request(s), block acknowledgment (BA) setup request(s) or a combination of both. In some examples, the wireless communication device 604 can use the frame to convey multiple TWT requests by including multiple TWT requests in the RIC, optionally in combination with resource request(s) of other type(s) such as TSPEC request(s), BA request(s) or both.

In some examples, by conveying the TWT request during the fast BSS transition rather than waiting for the fast BSS transition to complete, the wireless communication device 604 can establish a TWT session with the target AP sooner, which may enable it to more quickly transition to a power-saving state. Additionally, the wireless communication device 604 can avoid the need for a separate frame exchange to establish the TWT session following the fast BSS transition. In some examples, by including multiple TWT requests in the RIC, the wireless communication device 604 can increase the likelihood that it will arrive at mutually-agreeable TWT parameters with the target AP. In some examples, the wireless communication device 604 can convey other types of resource requests, such as TSPEC requests, BA requests or both, without imposing additional signaling overhead on the wireless communication network 601 by including such additional requests in the RIC along with the TWT request(s).

Figure 8:
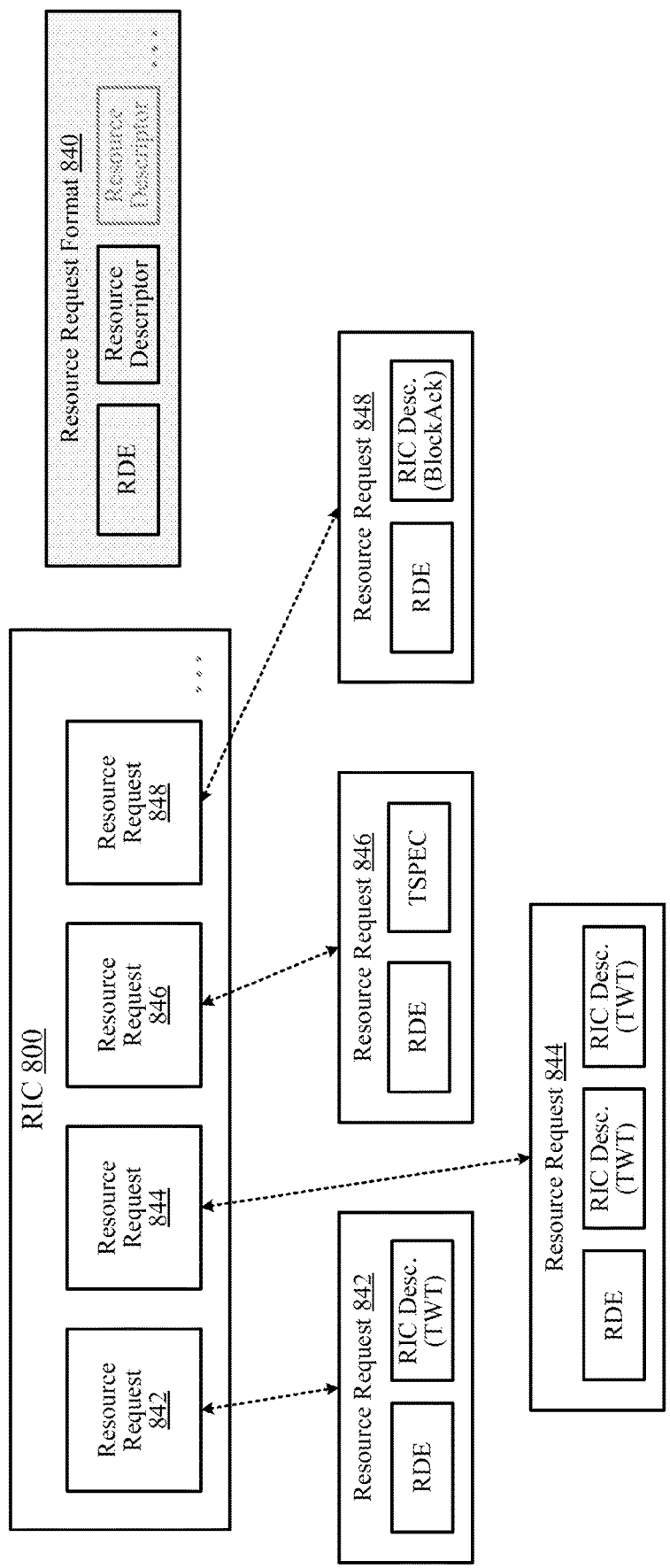
FIG. 8 shows an example of a resource information container (RIC).

FIG. 8 shows an example of a resource information container (RIC) 800. The RIC 800 includes multiple resource requests, including resource requests 842, 844, 846 and 848. As reflected by ellipses in the figure, the RIC 800 may include resource requests other than the depicted resource requests 842, 844, 846 and 848. The format of each resource request in the RIC 800 can conform to the resource request format 840 shown in FIG. 8. According to resource request format 840, the contents of each resource request include a RIC Data element (RDE) and one or more resource descriptors. The RDE can indicate a unique identifier for the resource request and a number of resource descriptors included in the resource request. Each resource descriptor can indicate a type of the resource request and set of parameters for the request. Multiple resource descriptors can be included in the resource request to indicate multiple alternative parameter sets for the resource request.

To use a resource request of the RIC 800 to convey a TWT request, a RIC descriptor element indicating a set of proposed TWT parameters can be used as a resource descriptor in that resource request. To identify multiple alternative proposed sets of TWT parameters, multiple such resource descriptors can be included in such a resource request. In FIG. 8, the resource requests 842 and 844 convey TWT requests. The resource request 842 includes a single TWT RIC descriptor, and thus identifies a single proposed TWT parameter set for its associated TWT request. The resource request 844 includes two TWT RIC descriptors, and this identifies two alternative proposed TWT parameter sets for its associated TWT request. In some examples, resource request format 840 may permit inclusion of an unlimited number of TWT RIC descriptors in a resource request that conveys a TWT request. In some other examples, resource request format 840 may permit inclusion of up to a certain number of TWT RIC descriptors in a resource request that conveys a TWT request, such as up to eight TWT RIC descriptors for instance.

As reflected in FIG. 8, the RIC 800 can include resource requests of other types in addition to those conveying TWT requests. In the depicted example, the RIC 800 includes a resource request 846 that conveys a traffic stream setup request, and a resource request 848 that conveys a block acknowledgment setup request. The resource request 846 includes a single resource descriptor in the form of a traffic specification (TSPEC) element, which can indicate a set of traffic stream parameters for its associated traffic stream setup request. The resource request 848 includes a single resource descriptor in the form of a Block Ack RIC descriptor, which can indicate a set of BA parameters for its associated BA setup request.

Figure 9A:
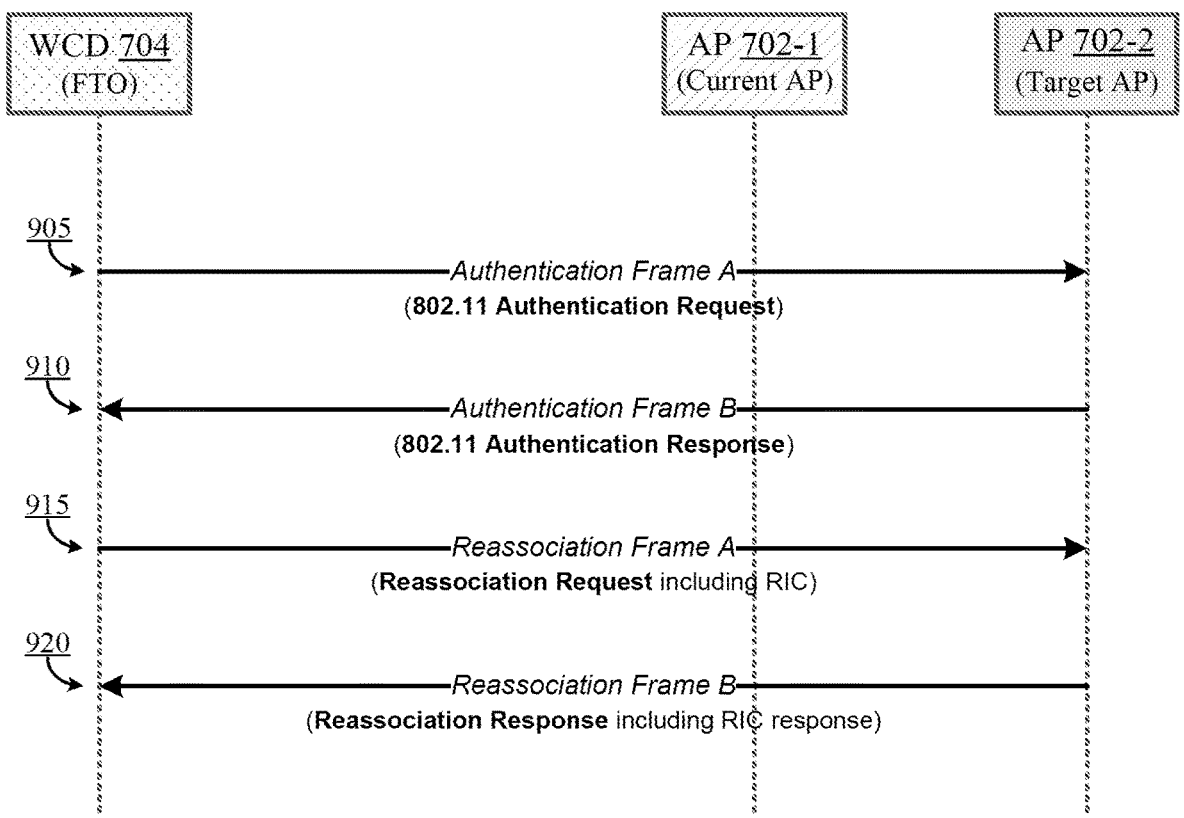
FIG. 9A shows an example of an over-the-air fast BSS transition communications exchange that conveys a TWT request in a reassociation frame.

FIG. 9A shows an example of an over-the-air fast BSS transition (FT) communications exchange 900 that conveys a TWT request in a reassociation frame. According to the over-the-air FT communications exchange 900, the wireless communication device 704 directly conveys a TWT request to the target AP 702-2 in conjunction with an over-the-air fast BSS transition from the current AP 702-1 to the target AP 702-2. The over-the-air FT communications exchange 900 involves an exchange of the same authentication frames A and B and reassociation frames A and B between the wireless communication device 704 and the target AP 702-2 as does the communications exchange 700 of FIG. 7A.

At 905, the wireless communication device 704 transmits the authentication frame A to the target AP 702-2. At 910, the wireless communication device 704 receives the authentication frame B from the target AP 702-2. At 915, the wireless communication device 704 transmits the reassociation frame A to the target AP 702-2. To convey a TWT request to the target AP 702-2, the wireless communication device 704 includes, in the reassociation frame A, a RIC containing a resource request indicating the TWT request. At 920, the wireless communication device 704 receives the reassociation frame B from the target AP 702-2. The reassociation frame B includes a RIC response containing a resource response for the TWT request conveyed in the reassociation frame A.

Figure 9B:
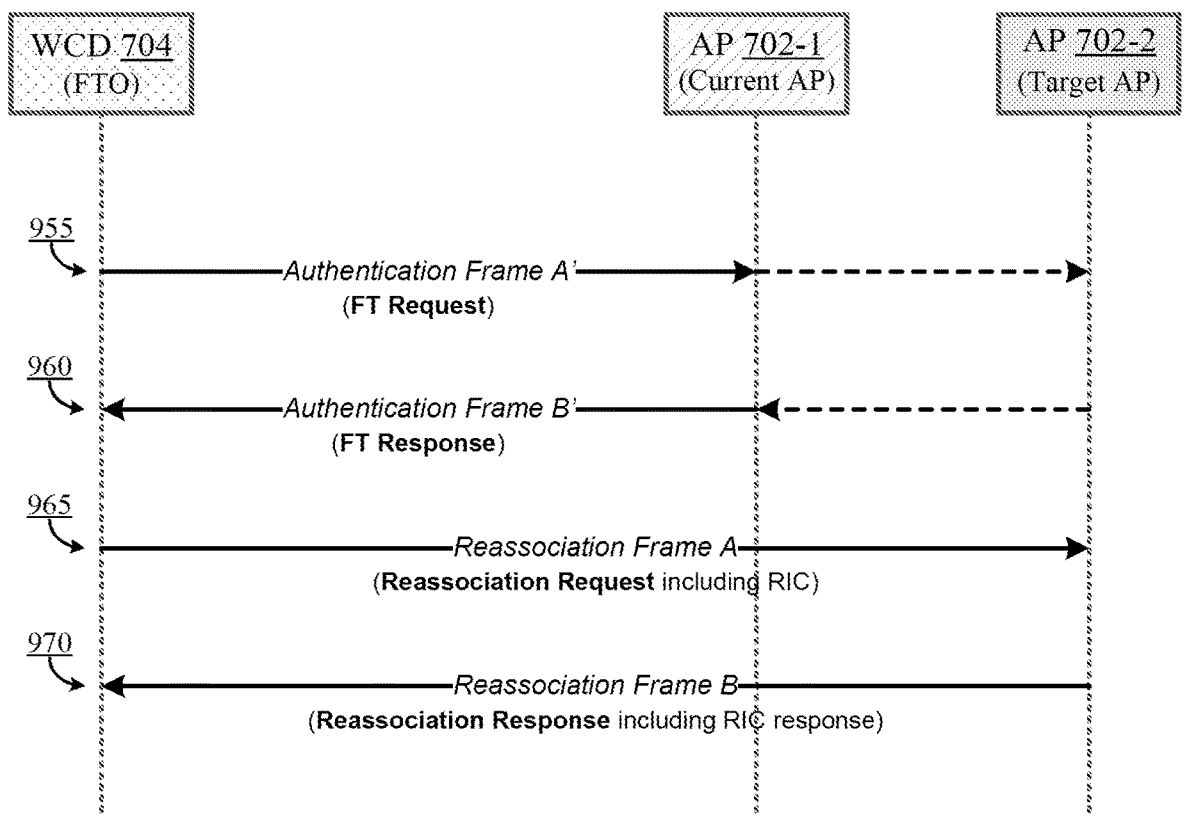
FIG. 9B shows an example of an over-the-DS fast BSS transition communications exchange that conveys a TWT request in a reassociation frame.

FIG. 9B shows an example of an over-the-DS FT communications exchange 950 that conveys a TWT request in a reassociation frame. According to the over-the-DS FT communications exchange 950, the wireless communication device 704 directly conveys a TWT request to the target AP 702-2 in conjunction with an over-the-DS fast BSS transition from the current AP 702-1 to the target AP 702-2. The over-the-DS FT communications exchange 950 involves an exchange of the same authentication frames A' and B' and reassociation frames A and B as does the communications exchange 750 of FIG. 7B.

At 955, the wireless communication device 704 transmits the authentication frame A' to the current AP 702-1. At 960, the wireless communication device 704 receives the authentication frame B' from the current AP 702-1. At 965, the wireless communication device 704 transmits the reassociation frame A to the target AP 702-2. To convey a TWT request to the target AP 702-2, the wireless communication device 704 includes, in the reassociation frame A, a RIC containing a resource request indicating the TWT request. At 970, the wireless communication device 704 receives the reassociation frame B from the target AP 702-2. The reassociation frame B includes a RIC response containing a resource response for the TWT request conveyed in the reassociation frame A.

Figure 10A:
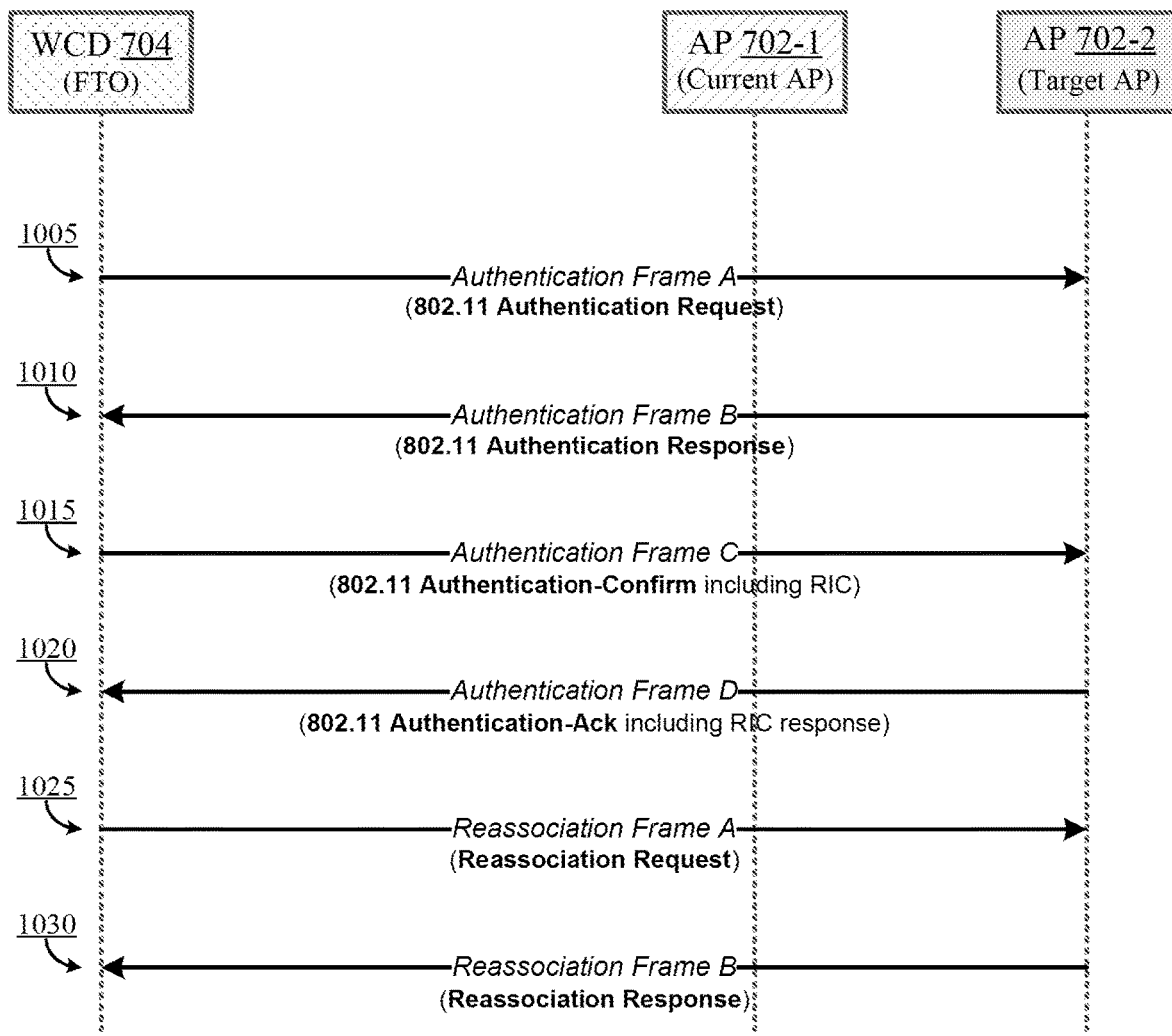
FIG. 10A shows an example of an over-the-air fast BSS transition communications exchange according to which a TWT request is conveyed prior to reassociation.

FIG. 10A shows an example of an over-the-air FT communications exchange 1000 according to which a TWT request is conveyed prior to reassociation. According to the over-the-air FT communications exchange 1000, the wireless communication device 704 directly conveys a TWT request to the target AP 702-2 in conjunction with an over-the-air fast BSS transition from the current AP 702-1 to the target AP 702-2. The over-the-air FT communications exchange 1000 involves an exchange of the same authentication frames A and B and reassociation frames A and B between the wireless communication device 704 and the target AP 702-2 as does the communications exchange 900 of FIG. 9A. However, an exchange of additional authentication frames C and D occurs prior to the exchange of the reassociation frames A and B, and the additional authentication frames C and D—rather than the subsequently exchanged reassociation frames A and B—are used to convey the RIC and the RIC response, respectively.

At 1005, the wireless communication device 704 transmits the authentication frame A to the target AP 702-2. At 1010, the wireless communication device 704 receives the authentication frame B from the target AP 702-2. At 1015, the wireless communication device 704 transmits the authentication frame C to the target AP 702-2. At 1020, the wireless communication device 704 receives the authentication frame D from the target AP 702-2. As shown in FIG. 10A, the authentication frame C can be an 802.11 Authentication-Confirm frame, and the authentication frame D can be an 802.11 Authentication-Ack frame. At 1025, the wireless communication device 704 transmits the reassociation frame A to the target AP 702-2. At 1030, the wireless communication device 704 receives the reassociation frame B from the target AP 702-2.

To convey a TWT request to the target AP 702-2, the wireless communication device 704 includes, in the authentication frame C, a RIC containing a resource request indicating the TWT request. The authentication frame D includes a RIC response containing a resource response for the TWT request conveyed in the authentication frame C.

Figure 10B:
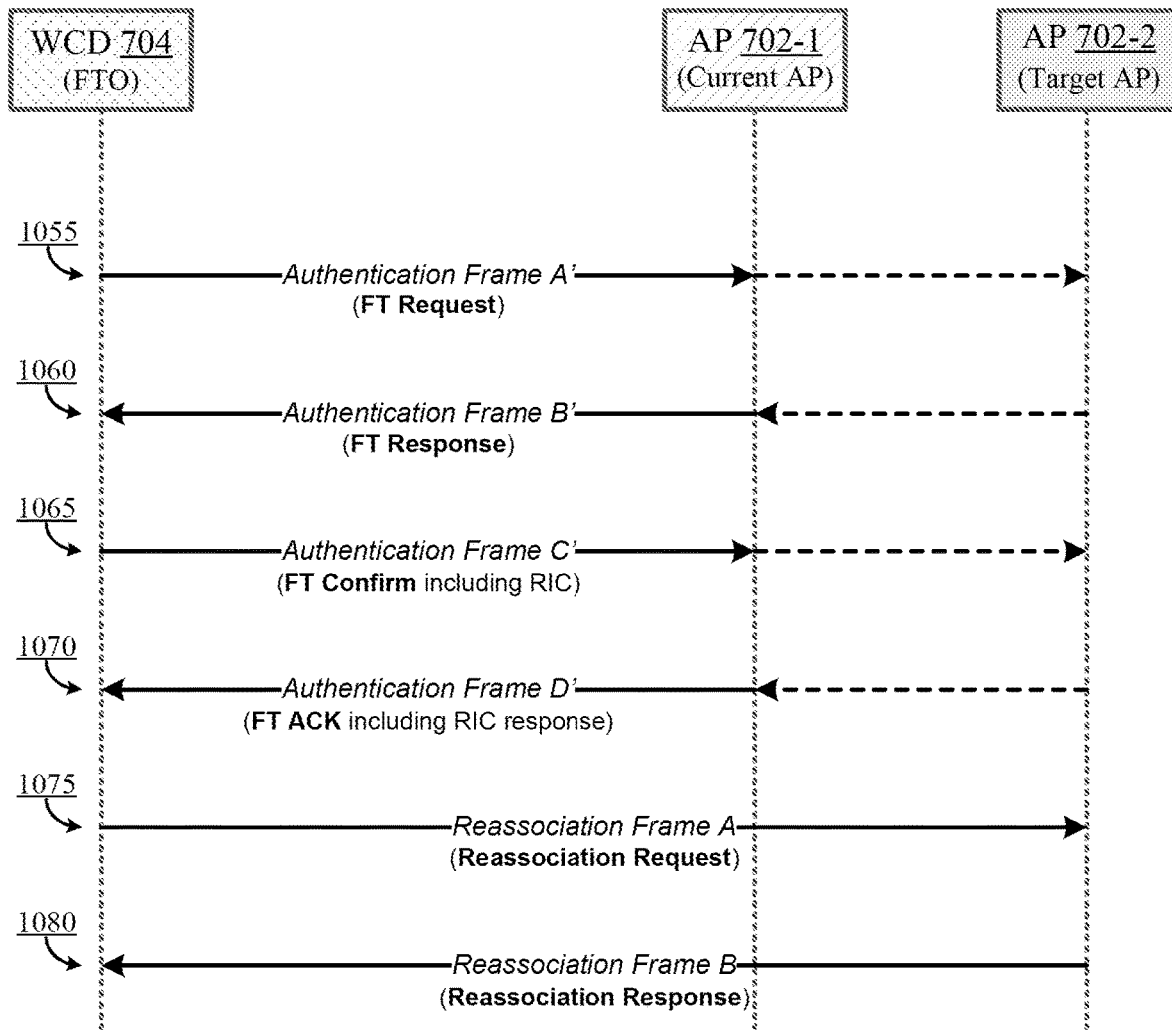
FIG. 10B shows an example of an over-the-DS fast BSS transition communications exchange according to which a TWT request is conveyed prior to reassociation.

FIG. 10B shows an example of an over-the-DS FT communications exchange 1050 according to which a TWT request is conveyed prior to reassociation. According to the over-the-DS FT communications exchange 1050, the wireless communication device 704 indirectly conveys a TWT request to the target AP 702-2, via the current AP 702-1, in conjunction with an over-the-DS fast BSS transition from the current AP 702-1 to the target AP 702-2. The over-the- DS FT communications exchange 1050 involves exchanges of the same authentication frames A' and B' and reassociation frames A and B as does the communications exchange 950 of FIG. 9B. However, an exchange of additional authentication frames C' and D' occurs prior to the exchange of the reassociation frames A and B, and the additional authentication frames C' and D'—rather than the subsequently exchanged reassociation frames A and B—are used to convey the RIC and the RIC response, respectively.

At 1055, the wireless communication device 704 transmits the authentication frame A' to the current AP 702-1. At 1060, the wireless communication device 704 receives the authentication frame B' from the current AP 702-1. At 1065, the wireless communication device 704 transmits the authentication frame C' to the current AP 702-1. At 1070, the wireless communication device 704 receives the authentication frame D' from the current AP 702-1. As shown in FIG. 10B, the authentication frame C' can be an FT Confirm frame, and the authentication frame D' can be an FT ACK frame. At 1075, the wireless communication device 704 transmits the reassociation frame A to the target AP 702-2. At 1080, the wireless communication device 704 receives the reassociation frame B from the target AP 702-2.

To convey a TWT request to the target AP 702-2, the wireless communication device 704 includes, in the authentication frame C' that it transmits to the current AP 702-1, a RIC containing a resource request indicating the TWT request. The current AP 702-1 forwards the information in the authentication frame C', including the RIC, to the target AP 702-2. The current AP 702-1 receives from the target AP 702-2 a reply that includes a RIC response containing a resource response for the TWT request conveyed in the authentication frame C'. The current AP 702-1 forwards the RIC response to the wireless communication device 704 by including it in the authentication frame D' that it transmits to the wireless communication device 704 at 1070.

Figure 11:
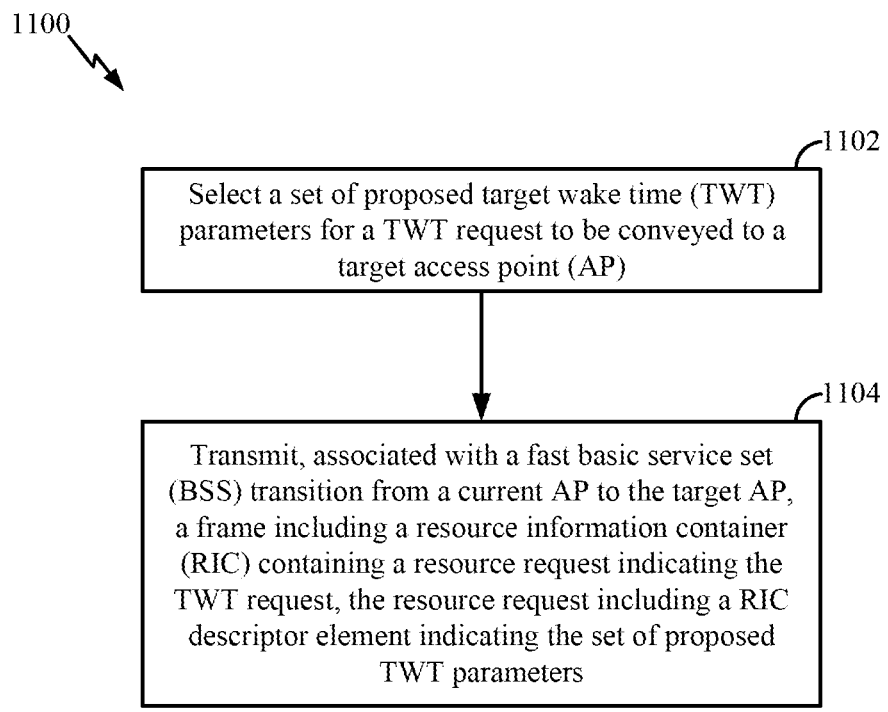
FIG. 11 shows a flowchart illustrating an example process performable by a wireless communication device, such as a wireless STA, that supports initiation of TWT session establishment during a fast BSS transition.

FIG. 11 shows a flowchart illustrating an example process 1100 performable by a wireless communication device, such as a wireless STA, that supports initiation of TWT session establishment during a fast BSS transition. The operations of the process 1100 may, for instance, be implemented by the wireless communication device 604 in the operating environment 600 of FIG. 6, or by the wireless communication device 704 in conjunction with any of the communication exchanges 900, 950, 1000 and 1050 of FIGS. 9A, 9B, 10A and 10B. In some examples, the operations of the process 1100 may be implemented by a wireless STA or its components as described herein. For instance, the process 1100 may be performed by a wireless communication device, such as the wireless communication device 1300 described with reference to FIG. 13, operating as or within a wireless STA. In some examples, the process 1100 may be performed by a wireless STA such as one of the STAs 104 described with reference to FIG. 1.

In some examples, in block 1102, the wireless communication device can select a set of proposed TWT parameters for a TWT request to be conveyed to a target AP. For example, in the operating environment 600 of FIG. 6, the wireless communication device 604 can select a set of proposed TWT parameters for a TWT request to be conveyed to the AP 602-3. In some examples, the set of proposed TWT parameters can include a proposed TWT wake interval, a proposed TWT wake duration or both.

In some examples, in block 1104, the wireless communication device can transmit, associated with a fast BSS transition from a current AP to the target AP, a frame including a RIC containing a resource request indicating the TWT request, the resource request including a RIC descriptor element indicating the set of proposed TWT parameters. For example, in the operating environment 600 of FIG. 6, associated with a fast BSS transition from the AP 602-1 to the AP 602-3, the wireless communication device 604 can transmit a frame including a RIC containing a resource request indicating a TWT request to be conveyed to the AP 602-3.

In some examples, the frame can be a Reassociation Request frame. In some other examples, the frame can be an Authentication-Confirm frame or an FT Confirm frame. In some examples, such as those in which the frame is a Reassociation Request frame or an Authentication-Confirm frame, the frame can be addressed to the target AP. In some other examples, such as those in which the frame is an FT Confirm frame, the frame can be addressed to the current AP. In some examples, the resource request can include a RIC data element (RDE) and one or more RIC descriptor elements, the one or more RIC descriptor elements including the RIC descriptor element indicating the set of proposed TWT parameters. In some examples, a set of TWT parameters associated with a TWT session between the wireless communication device and the current AP can be selected as the set of proposed TWT parameters.

In some examples, the wireless communication device can receive a second frame that includes a RIC response associated with the RIC, and the RIC response can contain a resource response indicating a result of the TWT request. In some examples, the second frame can be a Reassociation Response frame. In some other examples, the second frame can be an Authentication-Ack frame or an FT ACK frame. In some examples, the resource response can include an RDE that includes a status code field indicating the result of the TWT request. In some examples, the wireless communication device can initiate a TWT session between the wireless communication device and the target AP associated with the resource response indicating that the TWT request has succeeded. In some examples, the TWT session can be initiated according to a set of TWT parameters indicated by a RIC descriptor element included in the resource response.

Figure 12:
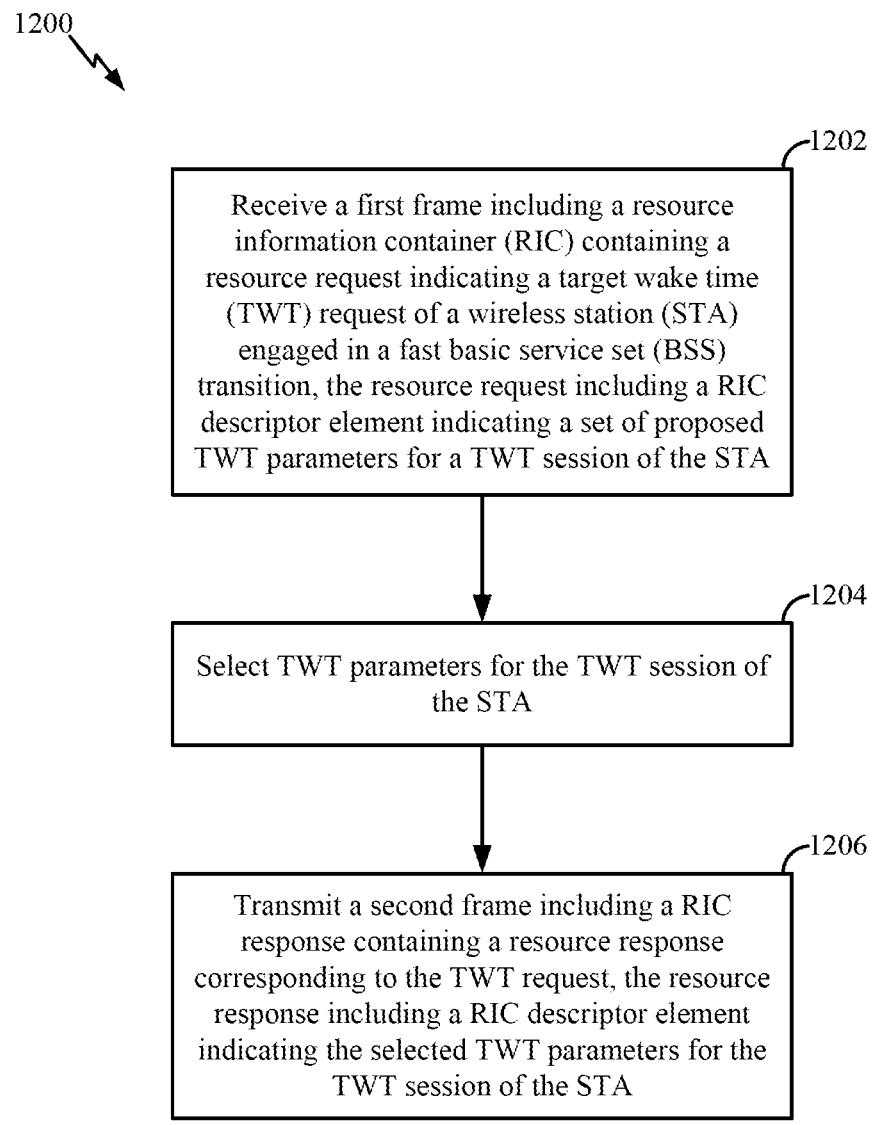
FIG. 12 shows a flowchart illustrating an example process performable by a wireless communication device, such as a wireless AP, that supports initiation of TWT session establishment during a fast BSS transition.

FIG. 12 shows a flowchart illustrating an example process 1200 performable by a wireless communication device, such as a wireless AP, that supports initiation of TWT session establishment during a fast BSS transition. The operations of the process 1200 may, for instance, be implemented by the target AP 702-2 in conjunction with any of the communication exchanges 900, 950, 1000 and 1050 of FIGS. 9A, 9B, 10A and 10B. In some examples, the operations of the process 1200 may be implemented by a wireless AP or its components as described herein. For instance, the process 1200 may be performed by a wireless communication device, such as the wireless communication device 1400 described with reference to FIG. 14, operating as or within a wireless AP. In some examples, the process 1200 may be performed by a wireless AP such as one of the APs 102 described with reference to FIG. 1.

In some examples, in block 1202, the wireless AP can receive a first frame including a RIC containing a resource request indicating a TWT request of a STA engaged in a fast BSS transition, the resource request including a RIC descriptor element indicating a set of proposed TWT parameters for a TWT session of the STA. For example, in the operating environment 600 of FIG. 6, the AP 602-3 can receive a frame including a RIC containing a resource request indicating a TWT request of the wireless communication device 604, which can be engaged in a fast BSS transition from the AP 602-1 to the AP 602-3, and the resource request can include a RIC descriptor element indicating a set of proposed TWT parameters for a TWT session between the wireless communication device 604 and the AP 602-3.

In some examples, in block 1204, the wireless AP can select TWT parameters for the TWT session of the STA. For example, in the operating environment 600 of FIG. 6, the AP 602-3 can select TWT parameters for the TWT session between the wireless communication device 604 and the AP 602-3. In some examples, the selected TWT parameters can include a TWT wake interval, a TWT wake duration or both.

In some examples, in block 1206, the wireless AP can transmit a second frame including a RIC response containing a resource response corresponding to the TWT request, the resource response including a RIC descriptor element indicating the selected TWT parameters for the TWT session of the STA. For example, in the operating environment 600 of FIG. 6, the AP 602-3 can transmit a frame including a RIC response containing a resource response corresponding to a TWT request conveyed by the wireless communication device 604, and the resource response can include a RIC descriptor element indicating the selected TWT parameters for the TWT session between the wireless communication device 604 and the AP 602-3. In some examples, the second frame can be a Reassociation Response frame. In some other examples, the second frame can be an Authentication-Ack frame or an FT ACK frame. In some examples, the resource response can include an RDE that includes a status code field indicating the result of the TWT request.

Figure 13:
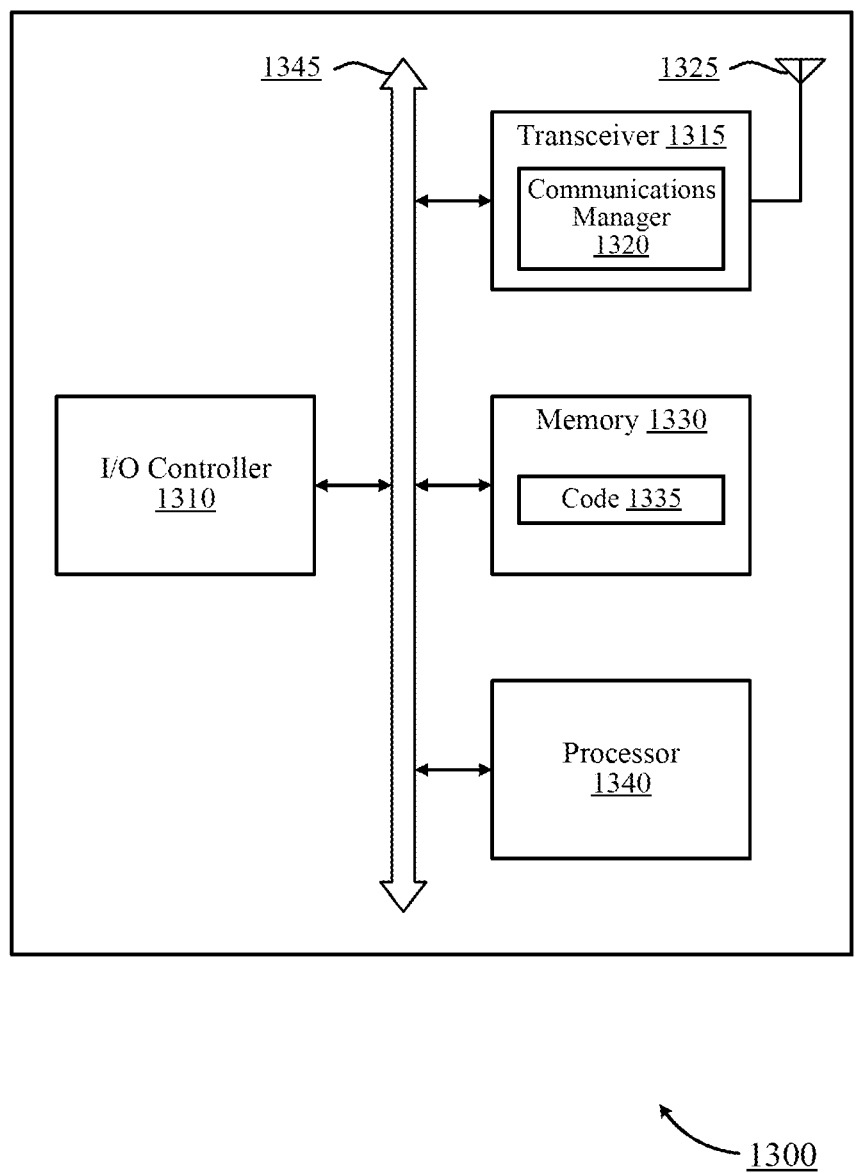
FIG. 13 shows a block diagram of a first example wireless communication device that supports initiation of TWT session establishment during a fast BSS transition.

FIG. 13 shows a block diagram of a first example wireless communication device 1300 that supports initiation of TWT session establishment during a fast BSS transition. In some implementations, the wireless communication device 1300 can be configured to perform the process 1100 described above with reference to FIG. 11. The wireless communication device 1300 may be an example implementation of one or both of the wireless communication device 604 of FIG. 6 and the wireless communication device 704 of FIGS. 7A, 7B, 9A, 9B, 10A and 10B. In some implementations, the wireless communication device 1300 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory"). In some implementations, the wireless communication device 1300 can be a device for use in a wireless STA, such as one of the wireless STAs 104 and 504 described above with reference to FIGS. 1 and 5, respectively. In other implementations, the wireless communication device 1300 can be a wireless STA that includes such a chip, SoC, chipset package or device as well as at least one antenna.

In some implementations, the wireless communication device 1300 can be capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. The wireless communication device 1300 may include components for bi-directional communications including components for transmitting and receiving communications, such as a communications manager 1320, an input/output (I/O) controller 1310, a transceiver 1315, an antenna 1325, a memory 1330, code 1335 and a processor 1340. These components may be in electronic communication or otherwise coupled (such as operatively, communicatively, functionally, electronically, electrically) via one or more buses (such as a bus 1345). In some implementations, the wireless communication device 1300 can further include a user interface (UI) (such as a touchscreen or keypad) and a display, which may be integrated with the UI to form a touchscreen display. In some implementations, the wireless communication device 1300 may further include one or more sensors such as, for example, one or more inertial sensors, accelerometers, temperature sensors, pressure sensors or altitude sensors.

The I/O controller 1310 may manage input and output signals for the wireless communication device 1300. The I/O controller 1310 also may manage peripherals not integrated into the wireless communication device 1300. In some implementations, the I/O controller 1310 may represent a physical connection or port to an external peripheral. In some implementations, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some implementations, the I/O controller 1310 may be implemented as part of a processor or processing system, such as the processor 1340. In some implementations, a user may interact with the wireless communication device 1300 via the I/O controller 1310 or via hardware components controlled by the I/O controller 1310.

In some implementations, the wireless communication device 1300 may include a single antenna 1325. However, in some other implementations, the wireless communication device 1300 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 also may include a modem to modulate the packets, to provide the modulated packets to one or more antennas 1325 for transmission, and to demodulate packets received from the one or more antennas 1325.

In some implementations, the transceiver 1315 may include one or more interfaces, such as one or more interfaces coupled with the one or more antennas 1325 that are configured to support various receiving or obtaining operations, or one or more interfaces coupled with the one or more antennas 1325 that are configured to support various transmitting or outputting operations, or a combination thereof. In some implementations, the transceiver 1315 may include or be configured for coupling with one or more processors or memory components that are operable to perform or support operations associated with received or obtained information or signals, or to generate information or other signals for transmission or other outputting, or any combination thereof. In some implementations, the transceiver 1315, or the transceiver 1315 and the one or more antennas 1325, or the transceiver 1315 and the one or more antennas 1325 and one or more processors or memory components (for example, the processor 1340, or the memory 1330, or both), may be included in a chip or chip assembly that is installed in the wireless communication device 1300.

The memory 1330 may include random access memory (RAM) and read-only memory (ROM). The memory 1330 may store computer-readable, computer-executable code 1335 including instructions that, when executed by the processor 1340, cause the wireless communication device 1300 to perform various functions described herein. The code 1335 may be stored in a non-transitory computer-readable medium such as system memory or another type of memory. In some implementations, the code 1335 may not be directly executable by the processor 1340 but may cause a computer (for example, when compiled and executed) to perform functions described herein. In some implementations, the memory 1330 may contain, among other things, a basic I/O system (BIOS) which may control basic hardware or software operation such as the interaction with peripheral components or devices.

The processor 1340 may be any one or more suitable processors capable of executing scripts or instructions of one or more software programs stored in the wireless communication device 1300 (such as within the memory 1330). In some implementations, the processor 1340 may be a component of a processing system. A processing system may generally refer to a system or series of machines or components that receives inputs and processes the inputs to produce a set of outputs (which may be passed to other systems or components of, for example, the wireless communication device 1300). For example, a processing system of the wireless communication device 1300 may refer to a system including the various other components or subcomponents of the wireless communication device 1300, such as the processor 1340, or the transceiver 1315, or the communications manager 1320, or other components or combinations of components of the wireless communication device 1300. The processing system of the wireless communication device 1300 may interface with other components of the wireless communication device 1300, and may process information received from other components (such as inputs or signals) or output information to other components. For example, a chip or modem of the wireless communication device 1300 may include a processing system, a first interface to output information and a second interface to obtain information. In some implementations, the first interface may refer to an interface between the processing system of the chip or modem and a transmitter, such that the wireless communication device 1300 may transmit information output from the chip or modem. In some implementations, the second interface may refer to an interface between the processing system of the chip or modem and a receiver, such that the wireless communication device 1300 may obtain information or signal inputs, and the information may be passed to the processing system. A person having ordinary skill in the art will readily recognize that the first interface also may obtain information or signal inputs, and the second interface also may output information or signal outputs.

The communications manager 1320 may support wireless communication by wireless communication device 1300 in accordance with examples as disclosed herein. For example, the communications manager 1320 may be configured as or otherwise support a means for selecting a set of proposed TWT parameters for a TWT request to be conveyed to a target AP. In some examples, the set of proposed TWT parameters can include a proposed TWT wake interval, a proposed TWT wake duration or both.

The communications manager 1320 may be configured as or otherwise support a means for transmitting, associated with a fast BSS transition from a current AP to the target AP, a frame including a RIC containing a resource request indicating the TWT request, where the resource request includes a RIC descriptor element indicating the set of proposed TWT parameters. In some examples, the frame can be a Reassociation Request frame. In some other examples, the frame can be an Authentication-Confirm frame or an FT Confirm frame. In some examples, such as those in which the frame is a Reassociation Request frame or an Authentication-Confirm frame, the frame can be addressed to the target AP. In some other examples, such as those in which the frame is an FT Confirm frame, the frame can be addressed to the current AP. In some examples, the resource request can include a RIC data element (RDE) and one or more RIC descriptor elements, the one or more RIC descriptor elements including the RIC descriptor element indicating the set of proposed TWT parameters. In some examples, a set of TWT parameters associated with a TWT session between the wireless communication device and the current AP can be selected as the set of proposed TWT parameters.

In some examples, the wireless communication device 1300 can receive a second frame that includes a RIC response associated with the RIC, and the RIC response can contain a resource response indicating a result of the TWT request. In some examples, the second frame can be a Reassociation Response frame. In some other examples, the second frame can be an Authentication-Ack frame or an FT ACK frame. In some examples, the resource response can include an RDE that includes a status code field indicating the result of the TWT request. In some examples, the wireless communication device 1300 can initiate a TWT session between the wireless communication device and the target AP associated with the resource response indicating that the TWT request has succeeded. In some examples, the TWT session can be initiated according to a set of TWT parameters indicated by a RIC descriptor element included in the resource response.

In some implementations, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a separate component, in some implementations, one or more functions described with reference to the communications manager 1320 may be supported by or performed by the processor 1340, the memory 1330, the code 1335, or any combination thereof. For example, the code 1335 may include instructions executable by the processor 1340 to cause the wireless communication device 1300 to perform various aspects of initiation of TWT session establishment during a fast BSS transition as described herein, or the processor 1340 and the memory 1330 may be otherwise configured to perform or support such operations.

Figure 14:
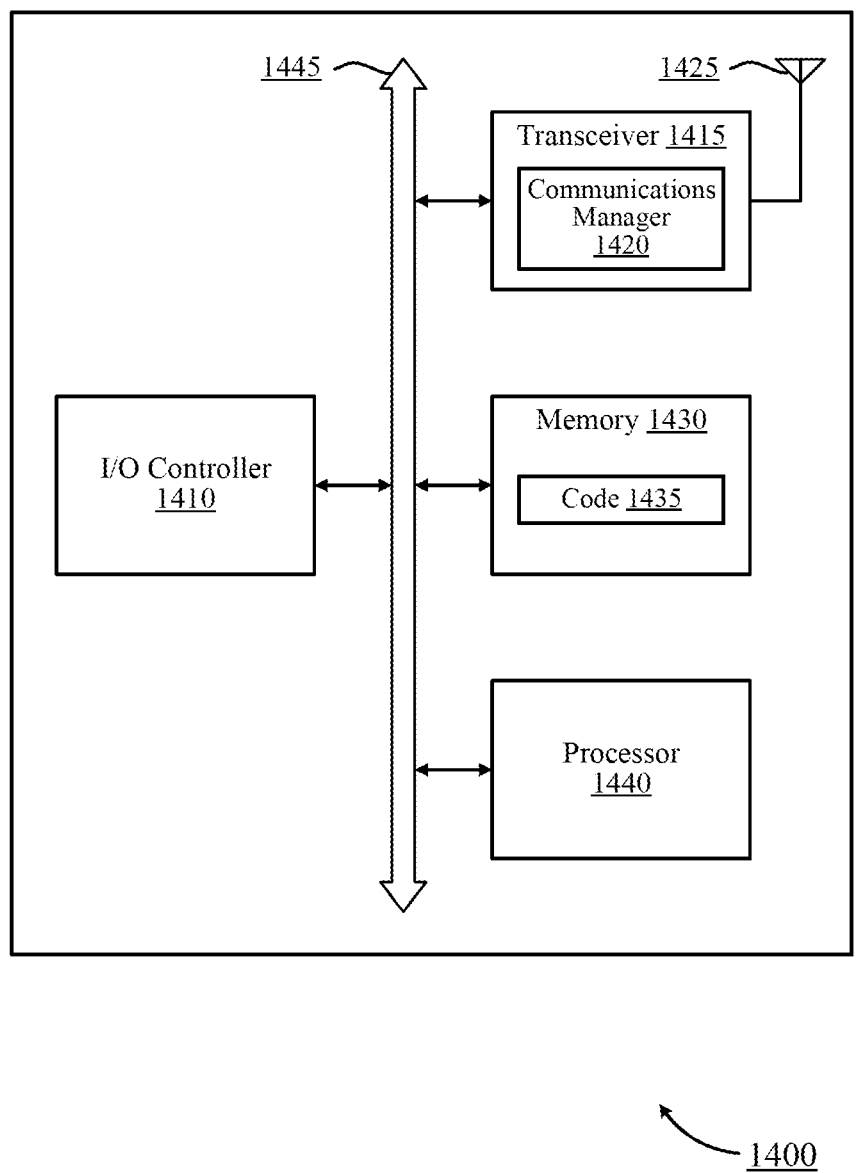
FIG. 14 shows a block diagram of a second example wireless communication device that supports initiation of TWT session establishment during a fast BSS transition.

FIG. 14 shows a block diagram of a second example wireless communication device 1400 that supports initiation of TWT session establishment during a fast BSS transition. In some implementations, the wireless communication device 1400 can be configured to perform the process 1200 described above with reference to FIG. 12. The wireless communication device 1400 may be an example implementation of any of the wireless APs 602-1, 602-2, 602-3, 702-1 and 702-2 of FIGS. 6, 7A, 7B, 9A, 9B, 10A and 10B. In some implementations, the wireless communication device 1400 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory"). In some implementations, the wireless communication device 1400 can be a device for use in one or both of the wireless APs 102 and 502 described above with reference to FIGS. 1 and 5, respectively. In other implementations, the wireless communication device 1400 can be a wireless AP that includes such a chip, SoC, chipset package or device as well as at least one antenna.

In some implementations, the wireless communication device 1400 can be capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. The wireless communication device 1400 may include components for bi-directional communications including components for transmitting and receiving communications, such as a communications manager 1420, an input/output (I/O) controller 1410, a transceiver 1415, an antenna 1425, a memory 1430, code 1435 and a processor 1440. These components may be in electronic communication or otherwise coupled (such as operatively, communicatively, functionally, electronically, electrically) via one or more buses (such as a bus 1445).

The I/O controller 1410 may manage input and output signals for the wireless communication device 1400. The I/O controller 1410 also may manage peripherals not integrated into the wireless communication device 1400. In some implementations, the I/O controller 1410 may represent a physical connection or port to an external peripheral. In some implementations, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some implementations, the I/O controller 1410 may be implemented as part of a processor or processing system, such as the processor 1440. In some implementations, a user may interact with the wireless communication device 1400 via the I/O controller 1410 or via hardware components controlled by the I/O controller 1410.

In some implementations, the wireless communication device 1400 may include a single antenna 1425. However, in some other implementations, the wireless communication device 1400 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 also may include a modem to modulate the packets, to provide the modulated packets to one or more antennas 1425 for transmission, and to demodulate packets received from the one or more antennas 1425.

In some implementations, the transceiver 1415 may include one or more interfaces, such as one or more interfaces coupled with the one or more antennas 1425 that are configured to support various receiving or obtaining operations, or one or more interfaces coupled with the one or more antennas 1425 that are configured to support various transmitting or outputting operations, or a combination thereof. In some implementations, the transceiver 1415 may include or be configured for coupling with one or more processors or memory components that are operable to perform or support operations associated with received or obtained information or signals, or to generate information or other signals for transmission or other outputting, or any combination thereof. In some implementations, the transceiver 1415, or the transceiver 1415 and the one or more antennas 1425, or the transceiver 1415 and the one or more antennas 1425 and one or more processors or memory components (for example, the processor 1440, or the memory 1430, or both), may be included in a chip or chip assembly that is installed in the wireless communication device 1400.

The memory 1430 may include random access memory (RAM) and read-only memory (ROM). The memory 1430 may store computer-readable, computer-executable code 1435 including instructions that, when executed by the processor 1440, cause the wireless communication device 1400 to perform various functions described herein. The code 1435 may be stored in a non-transitory computer-readable medium such as system memory or another type of memory. In some implementations, the code 1435 may not be directly executable by the processor 1440 but may cause a computer (for example, when compiled and executed) to perform functions described herein. In some implementations, the memory 1430 may contain, among other things, a basic I/O system (BIOS) which may control basic hardware or software operation such as the interaction with peripheral components or devices.

The processor 1440 may be any one or more suitable processors capable of executing scripts or instructions of one or more software programs stored in the wireless communication device 1400 (such as within the memory 1430). In some implementations, the processor 1440 may be a component of a processing system. A processing system may generally refer to a system or series of machines or components that receives inputs and processes the inputs to produce a set of outputs (which may be passed to other systems or components of, for example, the wireless communication device 1400). For example, a processing system of the wireless communication device 1400 may refer to a system including the various other components or subcomponents of the wireless communication device 1400, such as the processor 1440, or the transceiver 1415, or the communications manager 1420, or other components or combinations of components of the wireless communication device 1400. The processing system of the wireless communication device 1400 may interface with other components of the wireless communication device 1400, and may process information received from other components (such as inputs or signals) or output information to other components. For example, a chip or modem of the wireless communication device 1400 may include a processing system, a first interface to output information and a second interface to obtain information. In some implementations, the first interface may refer to an interface between the processing system of the chip or modem and a transmitter, such that the wireless communication device 1400 may transmit information output from the chip or modem. In some implementations, the second interface may refer to an interface between the processing system of the chip or modem and a receiver, such that the wireless communication device 1400 may obtain information or signal inputs, and the information may be passed to the processing system. A person having ordinary skill in the art will readily recognize that the first interface also may obtain information or signal inputs, and the second interface also may output information or signal outputs.

The communications manager 1420 may support wireless communication by wireless communication device 1400 in accordance with examples as disclosed herein. For example, the communications manager 1420 may be configured as or otherwise support a means for receiving a first frame including a RIC containing a resource request indicating a TWT request of a STA engaged in a fast BSS transition, where the resource request includes a RIC descriptor element indicating a set of proposed TWT parameters for a TWT session of the STA. In some examples, the first frame can be a Reassociation Request frame. In some other examples, the first frame can be an Authentication-Confirm frame or an FT Confirm frame. In some examples, the set of proposed TWT parameters can include a proposed TWT wake interval, a proposed TWT wake duration or both.

The communications manager 1420 may be configured as or otherwise support a means for selecting TWT parameters for the TWT session of the STA. In some examples, the selected TWT parameters can include a TWT wake interval, a TWT wake duration or both.

The communications manager 1420 may be configured as or otherwise support a means for transmitting a second frame including a RIC response containing a resource response corresponding to the TWT request, where the resource response includes a RIC descriptor element indicating the selected TWT parameters for the TWT session of the STA. In some examples, the second frame can be a Reassociation Response frame. In some other examples, the second frame can be an Authentication-Ack frame or an FT ACK frame. In some examples, the resource response can include an RDE that includes a status code field indicating the result of the TWT request.

In some implementations, the communications manager 1420 may be configured to perform various operations (for example, receiving, monitoring, transmitting) using or otherwise in cooperation with the transceiver 1415, the one or more antennas 1425, or any combination thereof. Although the communications manager 1420 is illustrated as a separate component, in some implementations, one or more functions described with reference to the communications manager 1420 may be supported by or performed by the processor 1440, the memory 1430, the code 1435, or any combination thereof. For example, the code 1435 may include instructions executable by the processor 1440 to cause the wireless communication device 1400 to perform various aspects of initiation of TWT session establishment during a fast BSS transition as described herein, or the processor 1440 and the memory 1430 may be otherwise configured to perform or support such operations.

Implementation examples are described in the following numbered clauses:

Clause 1. A wireless communication device for wireless communication, including a processing system operable to select a set of proposed target wake time (TWT) parameters for a TWT request to be conveyed to a target access point (AP), and one or more interfaces operable to output, associated with a fast basic service set (BSS) transition from a current AP to the target AP, a frame including a resource information container (RIC) containing a resource request indicating the TWT request, the resource request including a RIC descriptor element indicating the set of proposed TWT parameters.

Clause 2. The wireless communication device of clause 1, where the resource request includes a RIC data element (RDE) and one or more RIC descriptor elements, the one or more RIC descriptor elements including the RIC descriptor element indicating the set of proposed TWT parameters.

Clause 3. The wireless communication device of any of clauses 1 to 2, the processing system operable to select, as the set of proposed TWT parameters, a set of TWT parameters associated with a TWT session between the wireless communication device and the current AP.

Clause 4. The wireless communication device of any of clauses 1 to 3, where the resource request includes a second RIC descriptor element indicating a second set of proposed TWT parameters for the TWT request.

Clause 5. The wireless communication device of any of clauses 1 to 4, where the RIC contains a second resource request indicating a second TWT request, the second resource request including a second RIC descriptor element indicating a set of proposed TWT parameters for the second TWT request.

Clause 6. The wireless communication device of any of clauses 1 to 5, where the RIC further contains a resource request indicating a traffic stream setup request, the resource request indicating the traffic stream setup request including a traffic specification (TSPEC) element indicating a set of traffic stream parameters for the traffic stream setup request.

Clause 7. The wireless communication device of any of clauses 1 to 6, where the RIC further contains a resource request indicating a block acknowledgment setup request, the resource request indicating the block acknowledgment setup request including a RIC descriptor element indicating a set of block acknowledgment parameters for the block acknowledgment setup request.

Clause 8. The wireless communication device of any of clauses 1 to 7, where the frame is a Reassociation Request frame.

Clause 9. The wireless communication device of any of clauses 1 to 7, where the frame is an Authentication-Confirm frame or a fast basic service set transition (FT) Confirm frame.

Clause 10. The wireless communication device of any of clauses 1 to 9, the processing system operable to address the frame to the target AP.

Clause 11. The wireless communication device of any of clauses 1 to 9, the processing system operable to address the frame to the current AP.

Clause 12. The wireless communication device of any of clauses 1 to 11, the one or more interfaces operable to obtain a second frame including a RIC response associated with the RIC, the RIC response containing a resource response indicating a result of the TWT request.

Clause 13. The wireless communication device of clause 12, the resource response including a RIC data element (RDE) that includes a status code field indicating the result of the TWT request.

Clause 14. The wireless communication device of any of clauses 12 to 13, the processing system operable to initiate a TWT session between the wireless communication device and the target AP associated with the resource response indicating that the TWT request has succeeded.

Clause 15. The wireless communication device of clause 14, the processing system operable to initiate the TWT session according to a set of TWT parameters indicated by a RIC descriptor element included in the resource response.

Clause 16. The wireless communication device of any of clauses 1 to 15, where the set of proposed TWT parameters includes a proposed TWT wake interval, a proposed TWT wake duration, or both.

Clause 17. The wireless communication device of any of clauses 1 to 16, the processing system operable to obtain a second frame including a RIC response associated with the RIC, the RIC response including a resource response corresponding to the resource request, and obtaining TWT parameters for a TWT session between the wireless communication device and the target AP from the resource response.

Clause 18. The wireless communication device of clause 17, where the second frame is a Reassociation Response frame.

Clause 19. The wireless communication device of clause 17, where the second frame is an Authentication-Ack frame or a fast basic service set transition (FT) ACK frame.

Clause 20. A method for wireless communication by a wireless communication device, including selecting a set of proposed target wake time (TWT) parameters for a TWT request to be conveyed to a target access point (AP), and transmitting, associated with a fast basic service set (BSS) transition from a current AP to the target AP, a frame including a resource information container (RIC) containing a resource request indicating the TWT request, the resource request including a RIC descriptor element indicating the set of proposed TWT parameters.

Clause 21. The method of clause 20, where the set of proposed TWT parameters includes a proposed TWT wake interval, a proposed TWT wake duration, or both.

Clause 22. The method of any of clauses 20 to 21, further including receiving a second frame including a RIC response associated with the RIC, the RIC response including a resource response corresponding to the resource request, and obtaining TWT parameters for a TWT session between the wireless communication device and the target AP from the resource response.

Clause 23. The method of clause 22, where the second frame is a Reassociation Response frame.

Clause 24. The method of clause 22, where the second frame is an Authentication-Ack frame or an FT ACK frame.

Clause 25. The method of any of clauses 20 to 24, where the resource request includes a RIC data element (RDE) and one or more RIC descriptor elements, the one or more RIC descriptor elements including the RIC descriptor element indicating the set of proposed TWT parameters.

Clause 26. The method of any of clauses 20 to 25, further including selecting, as the set of proposed TWT parameters, a set of TWT parameters associated with a TWT session between the wireless communication device and the current AP.

Clause 27. The method of any of clauses 20 to 26, where the resource request includes a second RIC descriptor element indicating a second set of proposed TWT parameters for the TWT request.

Clause 28. The method of any of clauses 20 to 27, where the RIC contains a second resource request indicating a second TWT request, the second resource request including a second RIC descriptor element indicating a set of proposed TWT parameters for the second TWT request.

Clause 29. The method of any of clauses 20 to 28, where the RIC further contains a resource request indicating a traffic stream setup request, the resource request indicating the traffic stream setup request including a traffic specification (TSPEC) element indicating a set of traffic stream parameters for the traffic stream setup request.

Clause 30. The method of any of clauses 20 to 29, where the RIC further contains a resource request indicating a block acknowledgment setup request, the resource request indicating the block acknowledgment setup request including a RIC descriptor element indicating a set of block acknowledgment parameters for the block acknowledgment setup request.

Clause 31. The method of any of clauses 20 to 30, where the frame is a Reassociation Request frame.

Clause 32. The method of any of clauses 20 to 30, where the frame is an Authentication-Confirm frame or a fast basic service set transition (FT) Confirm frame.

Clause 33. The method of any of clauses 20 to 32, further including addressing the frame to the target AP.

Clause 34. The method of any of clauses 20 to 32, further including addressing the frame to the current AP.

Clause 35. The method of any of clauses 20 to 34, further including receiving a second frame including a RIC response associated with the RIC, the RIC response containing a resource response indicating a result of the TWT request.

Clause 36. The method of clause 35, the resource response including a RIC data element (RDE) that includes a status code field indicating the result of the TWT request.

Clause 37. The method of any of clauses 35 to 36, further including initiating a TWT session between the wireless communication device and the target AP associated with the resource response indicating that the TWT request has succeeded.

Clause 38. The method of clause 37, further including initiating the TWT session according to a set of TWT parameters indicated by a RIC descriptor element included in the resource response.

Clause 39. An apparatus for wireless communication by a wireless communication device, including means for selecting a set of proposed target wake time (TWT) parameters for a TWT request to be conveyed to a target access point (AP), and means for outputting, associated with a fast basic service set (BSS) transition from a current AP to the target AP, a frame including a resource information container (RIC) containing a resource request indicating the TWT request, the resource request including a RIC descriptor element indicating the set of proposed TWT parameters.

Clause 40. The apparatus of clause 39, where the resource request includes a RIC data element (RDE) and one or more RIC descriptor elements, the one or more RIC descriptor elements including the RIC descriptor element indicating the set of proposed TWT parameters.

Clause 41. The apparatus of any of clauses 39 to 40, further including means for selecting, as the set of proposed TWT parameters, a set of TWT parameters associated with a TWT session between the wireless communication device and the current AP.

Clause 42. The apparatus of any of clauses 39 to 41, where the resource request includes a second RIC descriptor element indicating a second set of proposed TWT parameters for the TWT request.

Clause 43. The apparatus of any of clauses 39 to 42, where the RIC contains a second resource request indicating a second TWT request, the second resource request including a second RIC descriptor element indicating a set of proposed TWT parameters for the second TWT request.

Clause 44. The apparatus of any of clauses 39 to 43, where the RIC further contains a resource request indicating a traffic stream setup request, the resource request indicating the traffic stream setup request including a traffic specification (TSPEC) element indicating a set of traffic stream parameters for the traffic stream setup request.

Clause 45. The apparatus of any of clauses 39 to 44, where the RIC further contains a resource request indicating a block acknowledgment setup request, the resource request indicating the block acknowledgment setup request including a RIC descriptor element indicating a set of block acknowledgment parameters for the block acknowledgment setup request.

Clause 46. The apparatus of any of clauses 39 to 45, where the frame is a Reassociation Request frame.

Clause 47. The apparatus of any of clauses 39 to 45, where the frame is an Authentication-Confirm frame or a fast basic service set transition (FT) Confirm frame.

Clause 48. The apparatus of any of clauses 39 to 47, further including means for addressing the frame to the target AP.

Clause 49. The apparatus of any of clauses 39 to 47, further including means for addressing the frame to the current AP.

Clause 50. The apparatus of any of clauses 39 to 49, further including means for obtaining a second frame including a RIC response associated with the RIC, the RIC response containing a resource response indicating a result of the TWT request.

Clause 51. The apparatus of clause 50, the resource response including a RIC data element (RDE) that includes a status code field indicating the result of the TWT request.

Clause 52. The apparatus of any of clauses 50 to 51, further including means for initiating a TWT session between the wireless communication device and the target AP associated with the resource response indicating that the TWT request has succeeded.

Clause 53. The apparatus of clause 52, further including means for initiating the TWT session according to a set of TWT parameters indicated by a RIC descriptor element included in the resource response.

Clause 54. The apparatus of any of clauses 39 to 53, where the set of proposed TWT parameters includes a proposed TWT wake interval, a proposed TWT wake duration, or both.

Clause 55. The apparatus of any of clauses 39 to 54, further including means for obtaining a second frame including a RIC response associated with the RIC, the RIC response including a resource response corresponding to the resource request, and means for obtaining TWT parameters for a TWT session between the wireless communication device and the target AP from the resource response.

Clause 56. The apparatus of clause 55, where the second frame is a Reassociation Response frame.

Clause 57. The apparatus of clause 55, where the second frame is an Authentication-Ack frame or an FT ACK frame.

Clause 58. A wireless communication device for wireless communication, including one or more interfaces operable to obtain a first frame including a resource information container (RIC) containing a resource request indicating a target wake time (TWT) request of a wireless station (STA) engaged in a fast basic service set (BSS) transition, the resource request including a RIC descriptor element indicating a set of proposed TWT parameters for a TWT session of the STA, and a processing system operable to select TWT parameters for the TWT session of the STA.

Clause 59. The wireless communication device of clause 58, where the selected TWT parameters include a TWT wake interval, a TWT wake duration, or both.

Clause 60. The wireless communication device of any of clauses 58 to 59, where the one or more interfaces are operable to output a second frame including a RIC response containing a resource response corresponding to the TWT request, the resource response including a RIC descriptor element indicating the selected TWT parameters for the TWT session of the STA.

Clause 61. The wireless communication device of clause 60, where the second frame is a Reassociation Response frame.

Clause 62. The wireless communication device of clause 60, where the second frame is an Authentication-Ack frame or an FT ACK frame.

Clause 63. The wireless communication device of any of clauses 60 to 62, where the resource response includes a RIC data element (RDE) that includes a status code field indicating the result of the TWT request.

Clause 64. The wireless communication device of any of clauses 58 to 63, where the RIC further contains a resource request indicating a traffic stream setup request, the resource request indicating the traffic stream setup request including a traffic specification (TSPEC) element indicating a set of traffic stream parameters for the traffic stream setup request.

Clause 65. The wireless communication device of any of clauses 58 to 64, where the RIC further contains a resource request indicating a block acknowledgment setup request, the resource request indicating the block acknowledgment setup request including a RIC descriptor element indicating a set of block acknowledgment parameters for the block acknowledgment setup request.

Clause 66. The wireless communication device of any of clauses 58 to 65, where the first frame is a Reassociation Request frame.

Clause 67. The wireless communication device of any of clauses 58 to 65, where the first frame is an Authentication-Confirm frame or a fast basic service set transition (FT) Confirm frame.

Clause 68. A method for wireless communication by a wireless communication device, including receiving a first frame including a resource information container (RIC) containing a resource request indicating a target wake time (TWT) request of a wireless station (STA) engaged in a fast basic service set (BSS) transition, the resource request including a RIC descriptor element indicating a set of proposed TWT parameters for a TWT session of the STA, and selecting TWT parameters for the TWT session of the STA.

Clause 69. The method of clause 68, where the selected TWT parameters include a TWT wake interval, a TWT wake duration, or both.

Clause 70. The method of any of clauses 68 to 69, further including transmitting a second frame including a RIC response containing a resource response corresponding to the TWT request, the resource response including a RIC descriptor element indicating the selected TWT parameters for the TWT session of the STA.

Clause 71. The method of clause 70, where the second frame is a Reassociation Response frame.

Clause 72. The method of clause 70, where the second frame is an Authentication-Ack frame or an FT ACK frame.

Clause 73. The method of any of clauses 70 to 72, where the resource response includes a RIC data element (RDE) that includes a status code field indicating the result of the TWT request.

Clause 74. The method of any of clauses 68 to 73, where the RIC further contains a resource request indicating a traffic stream setup request, the resource request indicating the traffic stream setup request including a traffic specification (TSPEC) element indicating a set of traffic stream parameters for the traffic stream setup request.

Clause 75. The method of any of clauses 68 to 74, where the RIC further contains a resource request indicating a block acknowledgment setup request, the resource request indicating the block acknowledgment setup request including a RIC descriptor element indicating a set of block acknowledgment parameters for the block acknowledgment setup request.

Clause 76. The method of any of clauses 68 to 75, where the first frame is a Reassociation Request frame.

Clause 77. The method of any of clauses 68 to 75, where the first frame is an Authentication-Confirm frame or a fast basic service set transition (FT) Confirm frame.

Clause 78. An apparatus for wireless communication by a wireless communication device, including means for obtaining a first frame including a resource information container (RIC) containing a resource request indicating a target wake time (TWT) request of a wireless station (STA) engaged in a fast basic service set (BSS) transition, the resource request including a RIC descriptor element indicating a set of proposed TWT parameters for a TWT session of the STA, and means for selecting TWT parameters for the TWT session of the STA.

Clause 79. The apparatus of clause 78, where the selected TWT parameters include a TWT wake interval, a TWT wake duration, or both.

Clause 80. The apparatus of any of clauses 78 to 79, further including means for outputting a second frame including a RIC response containing a resource response corresponding to the TWT request, the resource response including a RIC descriptor element indicating the selected TWT parameters for the TWT session of the STA.

Clause 81. The apparatus of clause 80, where the second frame is a Reassociation Response frame.

Clause 82. The apparatus of clause 80, where the second frame is an Authentication-Ack frame or an FT ACK frame.

Clause 83. The apparatus of any of clauses 80 to 82, where the resource response includes a RIC data element (RDE) that includes a status code field indicating the result of the TWT request.

Clause 84. The apparatus of any of clauses 78 to 83, where the RIC further contains a resource request indicating a traffic stream setup request, the resource request indicating the traffic stream setup request including a traffic specification (TSPEC) element indicating a set of traffic stream parameters for the traffic stream setup request.

Clause 85. The apparatus of any of clauses 78 to 84, where the RIC further contains a resource request indicating a block acknowledgment setup request, the resource request indicating the block acknowledgment setup request including a RIC descriptor element indicating a set of block acknowledgment parameters for the block acknowledgment setup request.

Clause 86. The apparatus of any of clauses 78 to 85, where the first frame is a Reassociation Request frame.

Clause 87. The apparatus of any of clauses 78 to 85, where the first frame is an Authentication-Confirm frame or a fast basic service set transition (FT) Confirm frame.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only or a combination of a and b.

As used herein, "based on" is intended to be interpreted in the inclusive sense, unless otherwise explicitly indicated. For example, "based on" may be used interchangeably with "based at least in part on," "associated with" or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device for wireless communication, comprising:
a processing system that includes one or more processors and one or more memories coupled with the one or more processors, the processing system configured to cause the wireless communication device to:
select a set of proposed target wake time (TWT) parameters for a TWT request to be conveyed to a target access point (AP); and
output, associated with a fast basic service set (BSS) transition from a current AP to the target AP, a frame including a resource information container (RIC) containing a resource request indicating the TWT request, the resource request including a RIC descriptor element indicating the set of proposed TWT parameters.

2. The wireless communication device of claim 1, wherein the resource request includes a RIC data element (RDE) and one or more RIC descriptor elements, the one or more RIC descriptor elements including the RIC descriptor element indicating the set of proposed TWT parameters.

3. The wireless communication device of claim 1, wherein the processing system is further configured to cause the wireless communication device to:
select, as the set of proposed TWT parameters, a set of TWT parameters associated with a TWT session between the wireless communication device and the current AP.

4. The wireless communication device of claim 1, wherein the resource request includes a second RIC descriptor element indicating a second set of proposed TWT parameters for the TWT request.

5. The wireless communication device of claim 1, wherein the RIC contains a second resource request indicating a second TWT request, the second resource request including a second RIC descriptor element indicating a set of proposed TWT parameters for the second TWT request.

6. The wireless communication device of claim 1, wherein the RIC contains a second resource request indicating a traffic stream setup request, the second resource request including a traffic specification (TSPEC) element indicating a set of traffic stream parameters for the traffic stream setup request.

7. The wireless communication device of claim 1, wherein the RIC contains a second resource request indicating a block acknowledgment setup request, the second resource request including a RIC descriptor element indicating a set of block acknowledgment parameters for the block acknowledgment setup request.

8. The wireless communication device of claim 1, wherein the frame is a Reassociation Request frame.

9. The wireless communication device of claim 1, wherein the frame is an Authentication-Confirm frame or a fast basic service set transition (FT) Confirm frame.

10. The wireless communication device of claim 1, wherein the processing system is further configured to cause the wireless communication device to:
the frame to the target AP.

11. The wireless communication device of claim 1, wherein the processing system is further configured to cause the wireless communication device to:
address the frame to the current AP.

12. The wireless communication device of claim 1, wherein the processing system is further configured to cause the wireless communication device to:
obtain a second frame including a RIC response associated with the RIC, the RIC response containing a resource response indicating a result of the TWT request.

13. The wireless communication device of claim 12, the resource response including a RIC data element (RDE) that includes a status code field indicating the result of the TWT request.

14. The wireless communication device of claim 12, wherein the processing system is further configured to cause the wireless communication device to:
initiate a TWT session between the wireless communication device and the target AP associated with the resource response indicating that the TWT request has succeeded.

15. The wireless communication device of claim 14, wherein the processing system is further configured to cause the wireless communication device to:
initiating the TWT session according to a set of TWT parameters indicated by a RIC descriptor element included in the resource response.

16. A method for wireless communication by a wireless communication device, comprising:
selecting a set of proposed target wake time (TWT) parameters for a TWT request to be conveyed to a target access point (AP); and
transmitting, associated with a fast basic service set (BSS) transition from a current AP to the target AP, a frame including a resource information container (RIC) containing a resource request indicating the TWT request, the resource request including a RIC descriptor element indicating the set of proposed TWT parameters.

17. The method of claim 16, wherein the set of proposed TWT parameters includes a proposed TWT wake interval, a proposed TWT wake duration, or both.

18. The method of claim 16, further comprising:
receiving a second frame including a RIC response associated with the RIC, the RIC response including a resource response corresponding to the resource request; and obtaining TWT parameters for a TWT session between the wireless communication device and the target AP from the resource response.

19. The method of claim 18, wherein the second frame is a Reassociation Response frame.

20. The method of claim 18, wherein the second frame is an Authentication-Ack frame or a fast basic service set transition (FT) ACK frame.

* * * * *